(12) United States Patent
Takahashi

(10) Patent No.: US 12,342,077 B2
(45) Date of Patent: Jun. 24, 2025

(54) IMAGE CAPTURING DEVICE CAPABLE OF PERFORMING SHAKE CORRECTION AND METHOD OF CONTROLLING THEREOF

(71) Applicant: CANON KABUSHIKI KAISHA, Tokyo (JP)

(72) Inventor: Ryo Takahashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 67 days.

(21) Appl. No.: 18/462,538

(22) Filed: Sep. 7, 2023

(65) Prior Publication Data
US 2024/0089598 A1   Mar. 14, 2024

(30) Foreign Application Priority Data
Sep. 13, 2022   (JP) .................................. 2022-145556

(51) Int. Cl.
*H04N 23/68*   (2023.01)
*H04N 23/63*   (2023.01)
*H04N 23/667*   (2023.01)

(52) U.S. Cl.
CPC ......... *H04N 23/683* (2023.01); *H04N 23/631* (2023.01); *H04N 23/667* (2023.01)

(58) Field of Classification Search
CPC .... H04N 23/62; H04N 23/631; H04N 23/632; H04N 23/667; H04N 23/6812; H04N 23/683; H04N 23/6842; H04N 23/687; H04N 23/69
See application file for complete search history.

(56) References Cited

U.S. PATENT DOCUMENTS

| 2015/0116503 A1 | 4/2015 | Fredlund |
| 2017/0180646 A1 | 6/2017 | Kim |
| 2023/0217105 A1 | 7/2023 | Sato |
| 2023/0217112 A1* | 7/2023 | Ino ....................... H04N 23/687 348/207.99 |

FOREIGN PATENT DOCUMENTS

| JP | 2013-117650 A | 6/2013 |
| JP | 2021-029035 A | 2/2021 |
| WO | 2021255975 A1 | 12/2021 |

OTHER PUBLICATIONS

The above patent documents was cited in a European Search Report issued on Jan. 3, 2024, which is enclosed, that issued in the corresponding European Patent Application No. 23195725.9.

* cited by examiner

*Primary Examiner* — Antoinette T Spinks
(74) *Attorney, Agent, or Firm* — Cowan, Liebowitz & Latman, P.C.

(57) ABSTRACT

An image capturing device is used which includes: an image capturing unit; and a control unit for performing control such that an image captured by the image capturing unit is displayed in a display unit, wherein the control unit is able to perform first angle-of-view display displaying the image with a first angle-of-view on the display unit and second angle-of-view display displaying the image with a second angle-of-view narrower than the first angle-of-view on the display unit by performing camera shake correction on the image and, in a case in which the image capturing device comes into a specific state when the second angle-of-view display is performed, the control unit displays an item for changing from the second angle-of-view display to the first angle-of-view on the display unit.

18 Claims, 17 Drawing Sheets

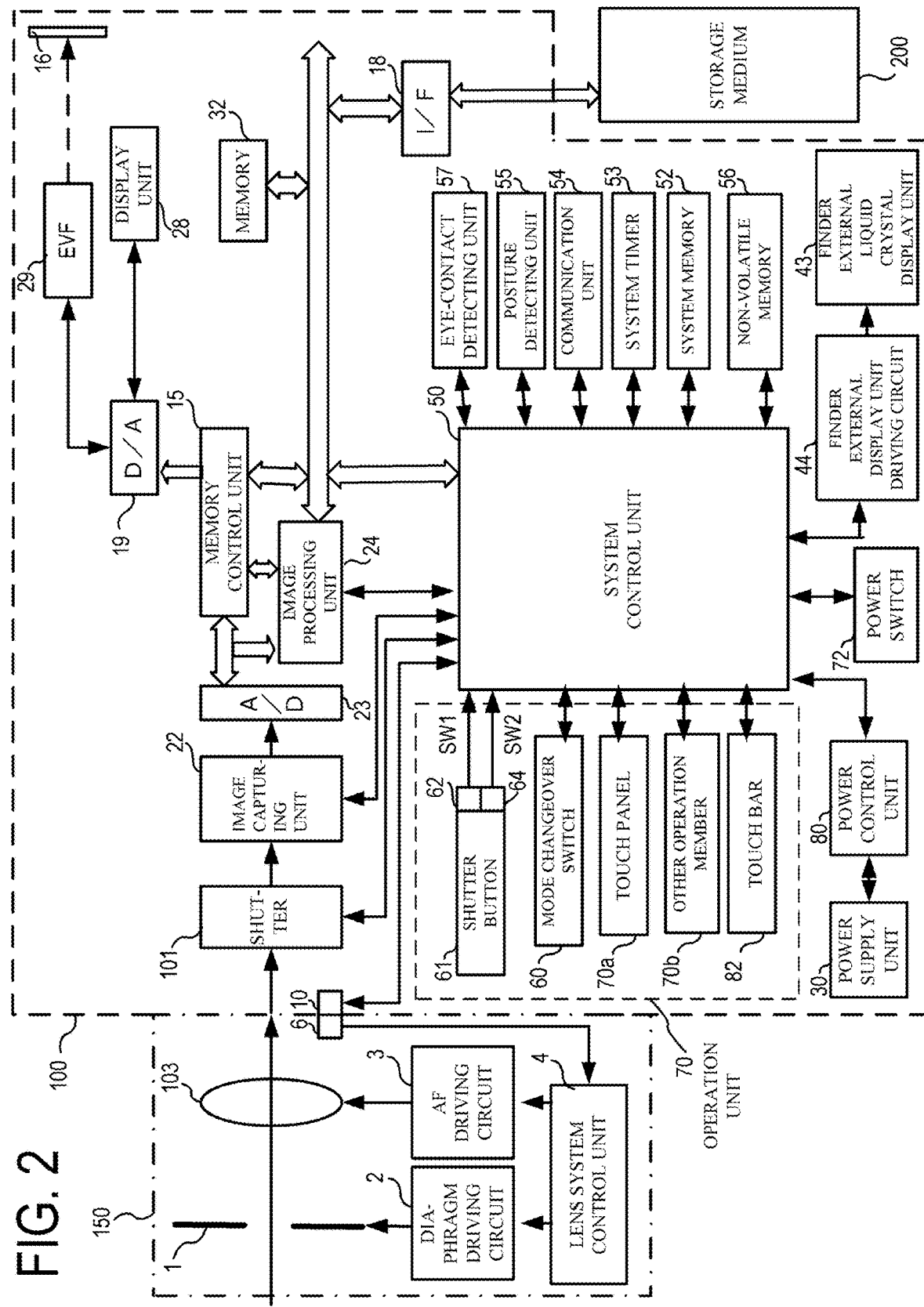

FIG. 12A
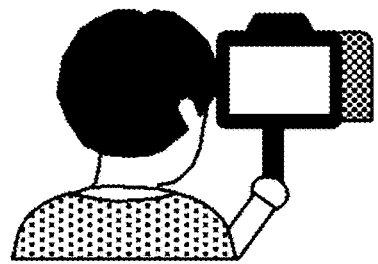
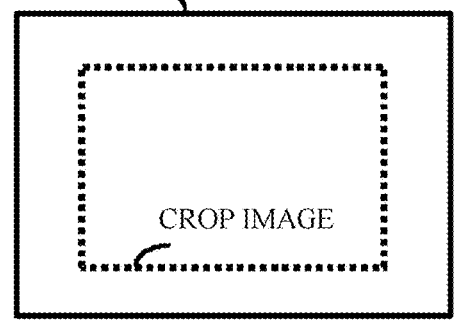
FIG. 12B
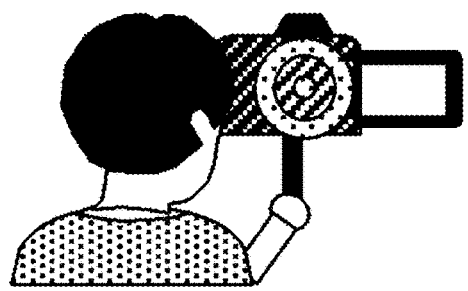
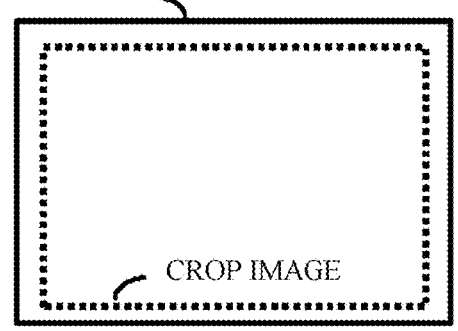
FIG. 12C
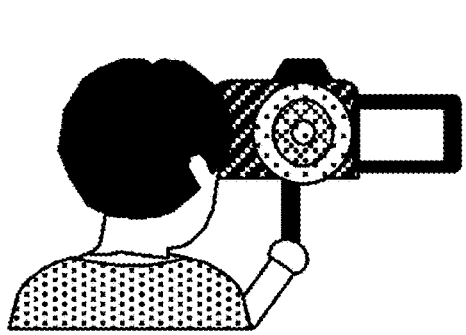
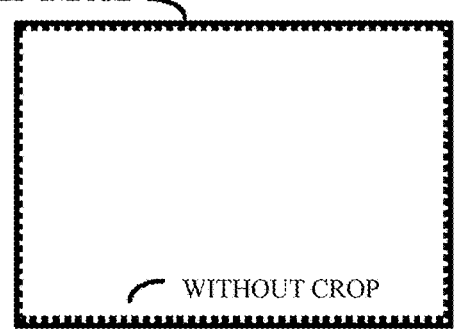

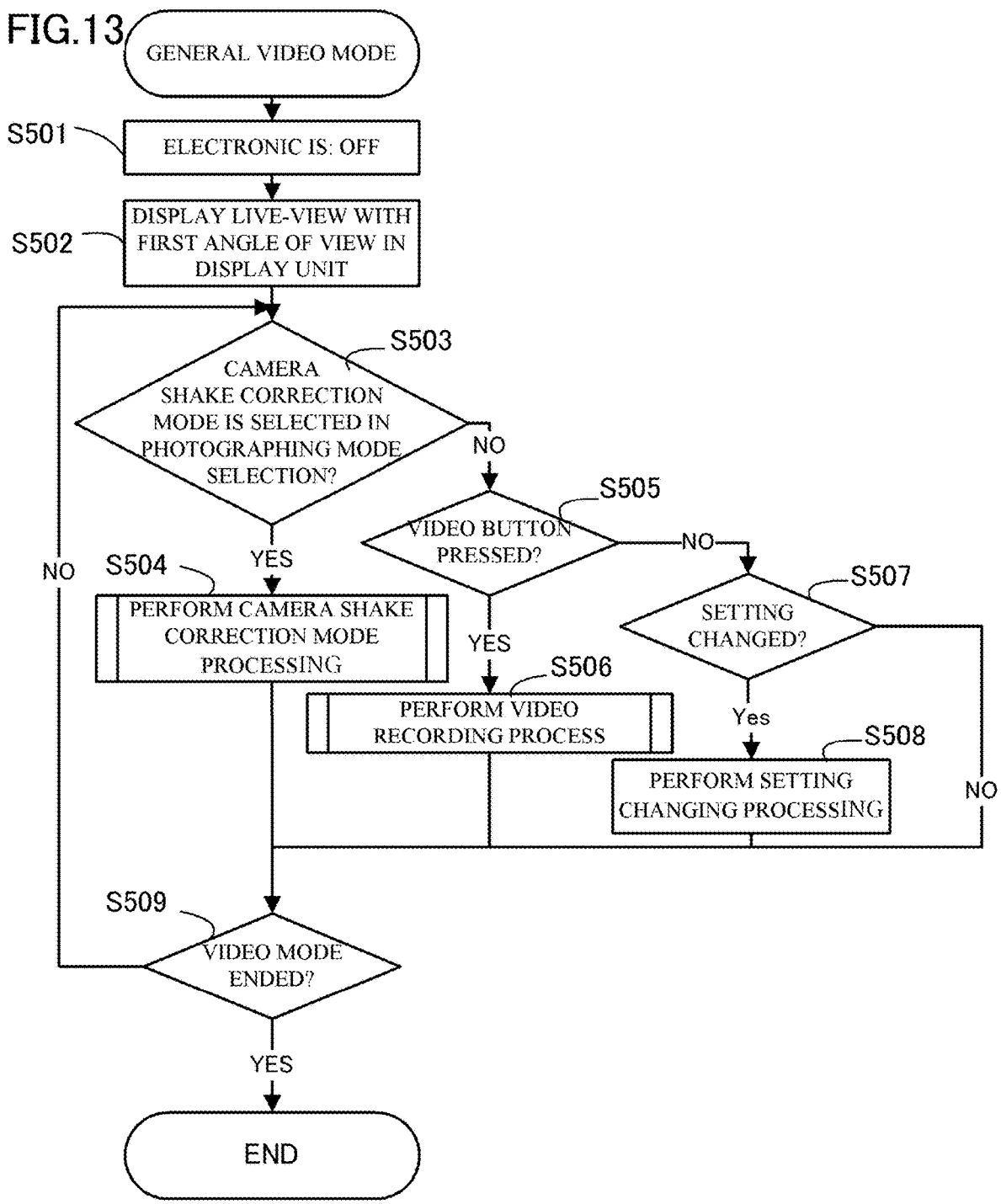

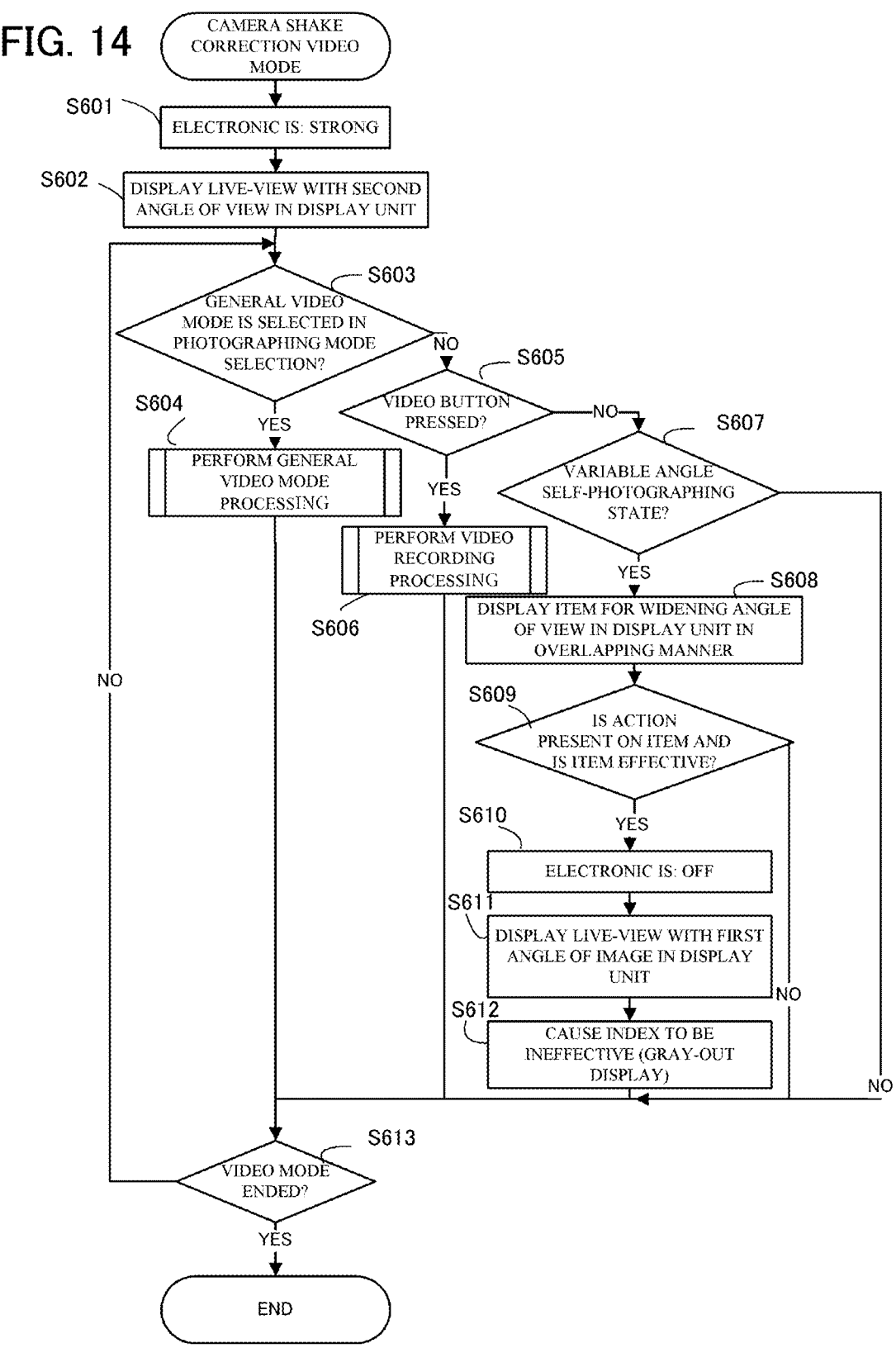

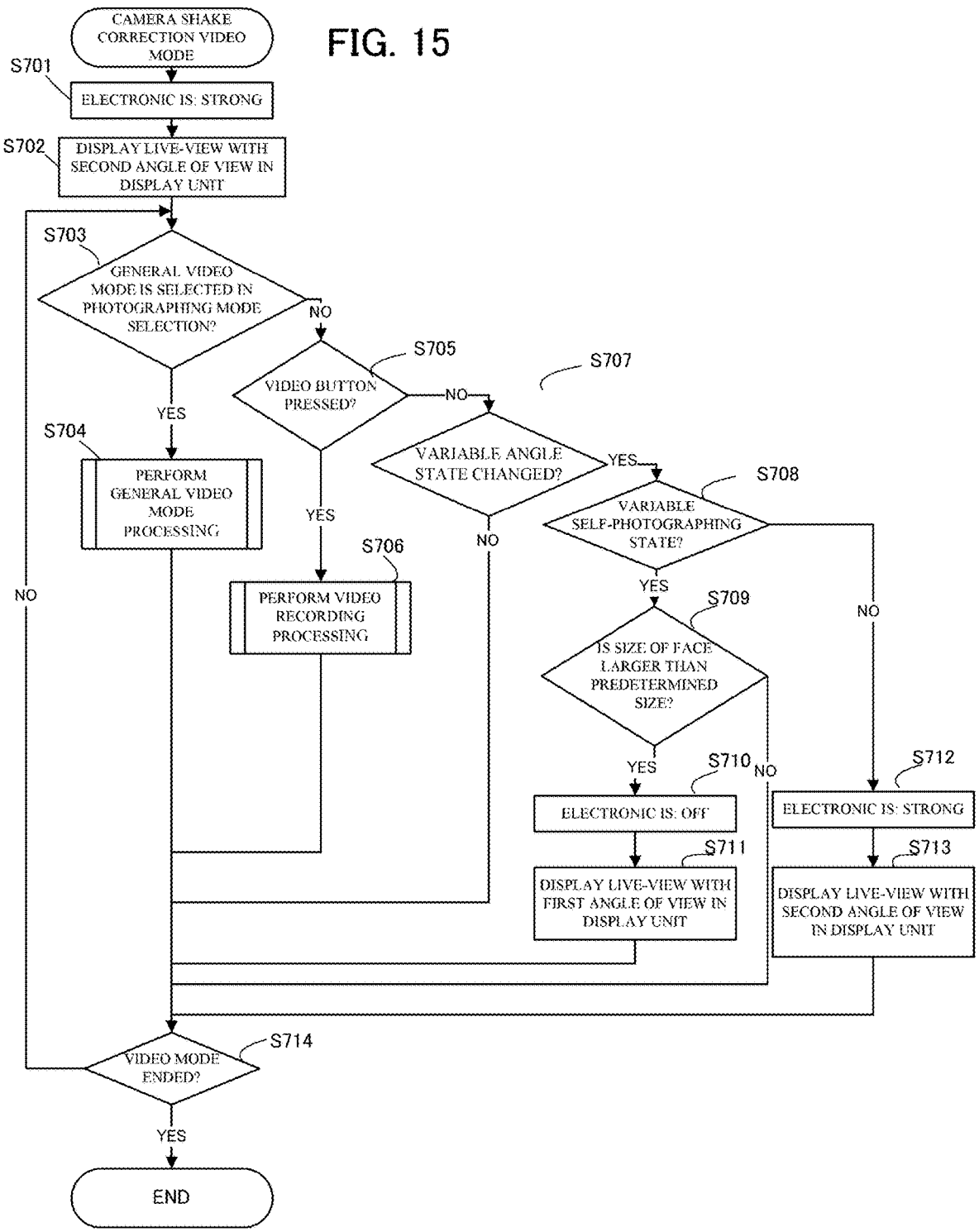

IMAGE CAPTURING DEVICE CAPABLE OF PERFORMING SHAKE CORRECTION AND METHOD OF CONTROLLING THEREOF

BACKGROUND OF THE INVENTION

Field of the Invention

The present invention relates to an image capturing device.

Description of the Related Art

In a video photographing mode of an image capturing device, a video capture image is recorded in a state in which an angle-of-view is configured to be narrower than an angle-of-view, with which photographing can be actually performed, such that camera shake correction during photographing can be performed.

SUMMARY OF THE INVENTION

At the time of image capture, particularly in a scene of photographing during walking, strong camera shake correction is desired to be performed, and thus there is a likelihood of recording in a state in which the photograph angle-of-view is narrowed by prioritizing the strength of camera shake correction processing. Here, while photographing during walking is performed in such a setting, there may be also a case in which a photographer desires to photograph himself or herself (self-photographing). In such a case, in a case in which an operating monitor is attached to an image capturing device, although photographing is performed with an imaging lens and the operating monitor being directed toward a photographer side, the angle-of-view is narrow, and thus a situation in which his or her face does not enter the photograph angle-of-view may occur. Although it depends on a mounted lens, generally, in the case of a lens other than a super-wide angle lens, even when a photographer stretches his or her hand while holding a camera, not all of his or her face enters a photograph angle-of-view. At this time, although a photograph angle-of-view can be returned to an ordinary photograph angle-of-view by invalidating the camera shake correction processing, an operation of changing the setting is bothersome, and a photographing timing may be missed. Particularly, in the case of a user who is not very knowledgeable about a setting operation, the user does not know that the range of the photograph angle-of-view expands when the camera shake correction processing is canceled, and thus there is a problem in that it is difficult for the user to perform an operation of quickly changing the setting.

For this problem, as illustrated in Japanese Patent Application Publication No. 2021-029035, there is a method in which an angle-of-view is narrowed by prioritizing shake correction in a case in which vibration is large in antivibration processing, and broadening of an angle-of-view is prioritized over shake correction processing in a case in which vibration is small. However, when an angle-of-view is forcibly moved, it is difficult for a user to ascertain a current state. In addition, since an angle-of-view is not broadened unless vibration is decreased, in a case in which photographing is performed with a camera being held, it is necessary to decrease vibration by performing photographing in a completely still state or the like. For this reason, whether or not an angle-of-view can be controlled depends also on a photographing skill of the photographer, and thus an expected behavior may not be formed.

In addition, as in Japanese Patent Application Publication No. 2013-117650, there is also a method in which, in order to set an appropriate angle-of-view for self-photographing, when a self-photographing state is selected, a photograph angle-of-view is forcibly adjusted to a wide-angle side. However, as in Japanese Patent Application Publication No. 2021-029035, when an angle-of-view is forcibly moved, there are problems in that it is difficult for a user to ascertain a current state, and there is no flexibility of control. In addition, there is also a problem in that such a method cannot be applied to a case of a non-attached lens.

In addition, as shared between Japanese Patent Application Publication No. 2021-029035 and Japanese Patent Application Publication No. 2013-117650, for example, in a case in which a super-wide angle lens is mounted, there is also a case in which a face falls into a photograph angle-of-view even in a state in which camera shake correction processing is performed and self-photographing is set. In such a case, there is a likelihood that a user does not want to widen the photograph angle-of-view even by invalidating the camera shake correction processing. For this reason, forcible control of an angle-of-view may cause disadvantages that the usability is poor, and there is no flexibility.

The present invention has been made in view of the problems described above, and an object thereof is to provide a technology enabling an image capturing device to control an angle-of-view at a necessary time using a simple method.

The present invention provides an image capturing device comprising:

an image capturing unit; and
a control unit configured to perform control such that an image captured by the image capturing unit is displayed on a display unit, wherein
the control unit is able to perform first angle-of-view display displaying the image with a first angle-of-view on the display unit and second angle-of-view display displaying the image with a second angle-of-view narrower than the first angle-of-view on the display unit by performing camera shake correction on the image and,
in a case in which the image capturing device comes into a specific state when the second angle-of-view display is performed, the control unit displays an item for changing from the second angle-of-view display to the first angle-of-view display on the display unit.

The present invention also provides an image capturing device comprising:

an image capturing unit; and
a control unit configured to perform control such that an image captured by the image capturing unit is displayed on a display unit, wherein
the control unit is able to perform first angle-of-view display displaying the image with a first angle-of-view on the display unit and second angle-of-view display displaying the image with a second angle-of-view narrower than the first angle-of-view on the display unit by performing camera shake correction on the image and,
in a case in which the image capturing device comes into a specific state when the second angle-of-view display is performed, and a size of a face of a person in the image exceeds a predetermined threshold, the control unit changes from the second angle-of-view display to the first angle-of-view display.

The present invention also provides a method of controlling an image capturing device including an image capturing unit and a control unit configured to perform control such that an image captured by the image capturing unit is displayed on a display unit, the method comprising:

performing, by the control unit, first angle-of-view display displaying the image with a first angle-of-view on the display unit;

performing, by the control unit, second angle-of-view display displaying the image with a second angle-of-view narrower than the first angle-of-view on the display unit by performing camera shake correction on the image; and displaying, by the control unit, an item for changing from the second angle-of-view display to the first angle-of-view display on the display unit in a case in which the image capturing device comes into a specific state when the second angle-of-view display is performed.

Further features of the present invention will become apparent from the following description of exemplary embodiments with reference to the attached drawings.

BRIEF DESCRIPTION OF THE DRAWINGS

FIG. 2 is a schematic block diagram illustrating an example of a hardware configuration of a digital camera;

FIGS. 12A to 12C are diagrams illustrating angles-of-view of a live-view image;

FIG. 13 is a flowchart of a normal video photographing mode;

FIG. 14 is a flowchart of a hand shake correction video mode;

FIG. 15 is a flowchart of a hand shake correction video mode;

DESCRIPTION OF THE EMBODIMENTS

Hereinafter, an embodiment of the present invention will be described in detail with reference to the drawings. Here, dimensions, materials, and shapes of constituent components described in the embodiment and relative arrangements and the like thereof need to be appropriately changed in accordance with a configuration of a device to which the invention is applied, various conditions, and the like, and the scope of this invention is not intended to be limited to the following embodiment.

The present invention, for example, can be understood as an image capturing device, an image capturing method, a control device of an image capturing device, and a control method of an image capturing device.

Device Configuration

Figure 1A:
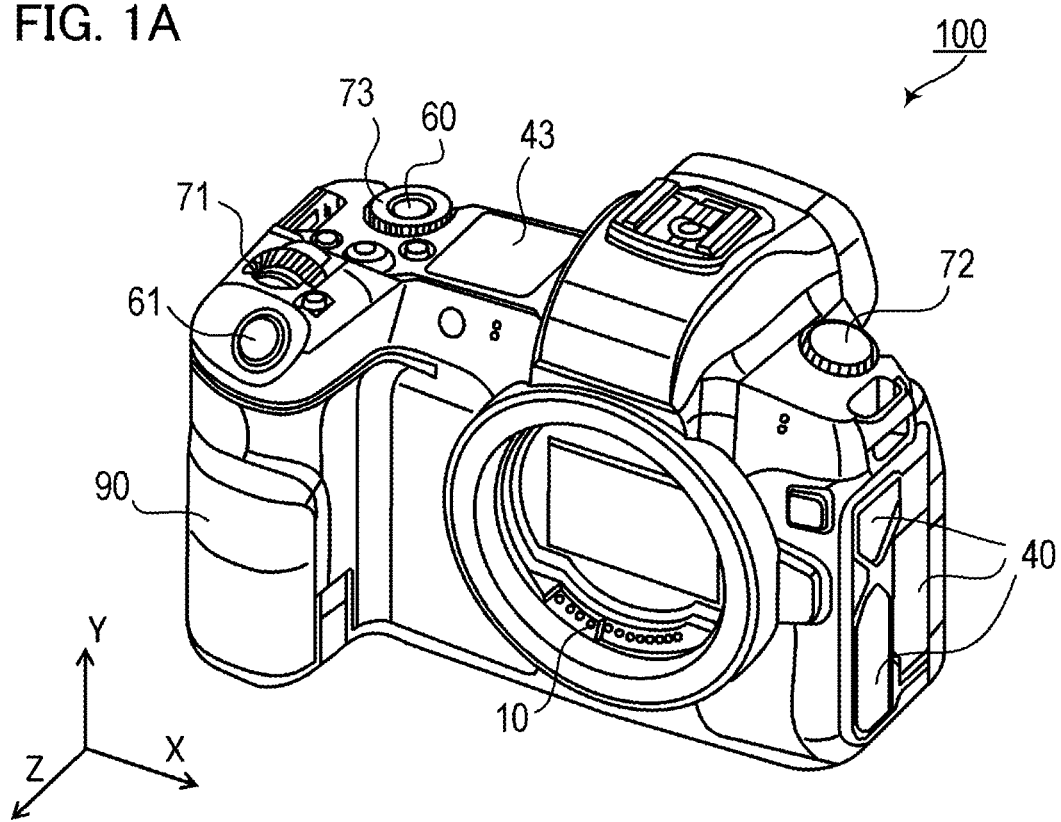
FIGS. 1A and 1B are external views of a digital camera.
Figure 1B:
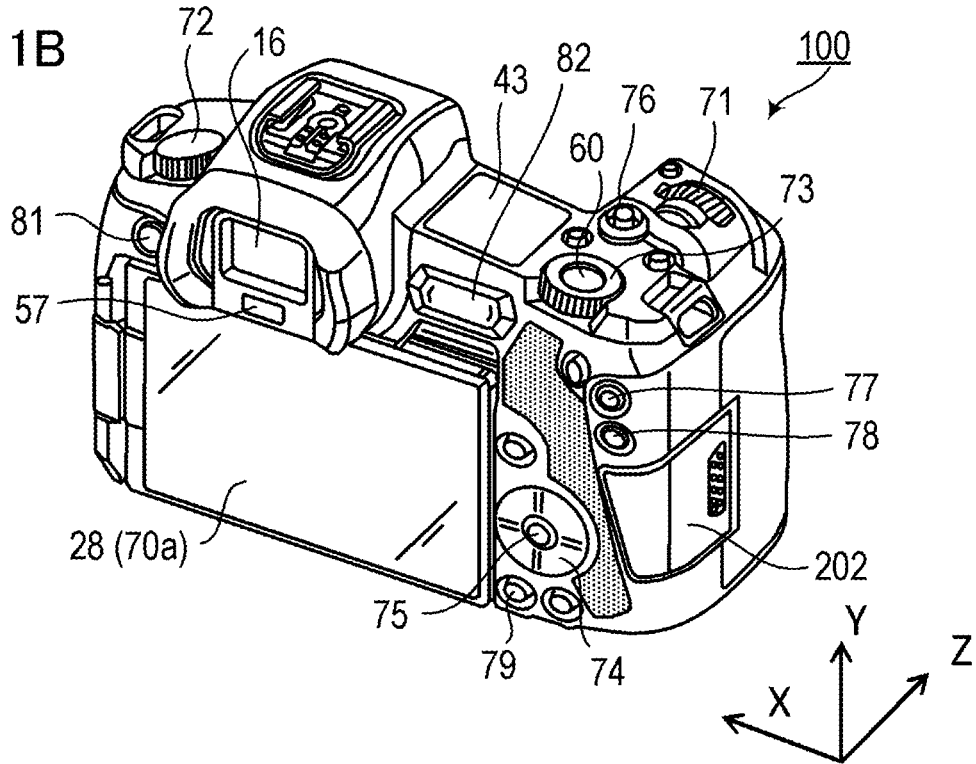

FIGS. 1A and 1B are external views of a digital camera 100 as one example of an image capturing device to which the present invention can be applied. FIG. 1A is a front face perspective view of the digital camera 100, and FIG. 1B is a rear face perspective view of the digital camera 100.

A display unit 28 is a display unit as a display unit disposed on the camera rear face that displays an image and various kinds of information. A touch panel 70a can detect a touch operation on a display face (operation face) of the display unit 28. A finder external display unit 43 is a display unit disposed on the surface of the camera, and displays various setting values of the camera including a shutter speed and a diaphragm. A shutter button 61 is an operation unit used for giving a photographing instruction. A mode changeover switch 60 is an operation unit used for switching between various modes. A terminal cover 40 is a cover that protects connectors (not illustrated) such as a connection cable connecting the digital camera 100 and a connection cable for an external device and the like. A main electronic dial 71 is a rotation operation member included in an operation unit 70, and, by turning this main electronic dial 71, setting values of a shutter speed, a diaphragm, and the like can be changed or the like.

A power switch 72 is an operation member switching on/off of power of the digital camera 100. A sub-electronic dial 73 is included in the operation unit 70, is a rotation operation member included in the operation unit 70, and can perform movement of a selection range, image transmission, and the like. A cross key 74 is included in the operation unit 70 and is a cross key (4-direction key) of which upper, lower, left, and right parts can be pressed. The cross key 74 can perform an operation corresponding to a pressed part. A set button 75 is included in the operation unit 70, is a pressing button, and is mainly used for determination of a selection item and the like. A video button 76 is used for an instruction of start and stop of video photographing (recording). An AF lock button 77 is included in the operation unit 70, and, by pressing the AF lock button in a photographing standby state, an exposed state can be fixed.

An enlargement button 78 is included in the operation unit 70 and is an operation button used for turning on/off of an enlargement mode for a live-view display of a photographing mode. By operating the main electronic dial 71 with the enlargement mode on, enlargement and reduction of an LV image can be performed. In a reproduction mode, the enlargement button 78 functions as an enlargement button used for increasing an enlargement rate by enlarging a reproduction image. A reproduction button 79 is included in the operation unit 70 and is an operation button switching between an image capturing mode and a reproduction mode. By pressing the reproduction button 79 in the image capturing mode, the mode proceeds to the reproduction mode and can cause the display unit 28 to display a latest image among images recorded in a recording medium 200.

A menu button 81 is included in the operation unit 70, and when the menu button 81 is pressed, a menu screen enabling various settings is displayed in the display unit 28. A user can intuitively perform various settings using the menu screen displayed in the display unit 28, the cross key 74, and the set button 75. A touch bar 82 is a touch operation member (a line touch sensor) of a linear shape that can accept a touch operation. The touch bar 82 is disposed at a position at which it can be operated using a thumb of a right hand holding a grip part 90. A tap operation (an operation of touch and release without movement within a predetermined period), a sliding operation to the left or right side (an operation of touching and moving the touch position with the touch maintained), and the like for the touch bar 82 can be accepted. The touch bar 82 is an operation member different from the touch panel 70a and does not have a display function. A communication terminal 10 is a communication terminal used for the digital camera 100 to communicate with a lens side (attachable/detachable).

An eyepiece part 16 is an eyepiece part of an eyepiece finder (a look-in-type finder), and a user can visually recognize a video display in an internal EVF 29 through the eyepiece part 16. An eye-contact detecting unit 57 is an eye contact detecting sensor that detects whether or not a photographer has his or her eye in contact with the eyepiece part 16. A lid 202 is a lid of a slot in which the recording medium 200 is stored. A grip part 90 is a holding part having a shape that can be easily gripped by the right hand when a user holds the digital camera 100. The shutter button 61 and the main electronic dial 71 are disposed at positions at which they can be operated by the index finger of the right hand in a state in which the digital camera is held by holding the grip part 90 using the little finger, the third finger, and the middle finger of the right hand. In addition, in the same state, the sub-electronic dial 73 and the touch bar 82 are disposed at positions at which they can be operated by the thumb of the right hand.

FIG. 2 is a block diagram illustrating a configuration example of the digital camera 100 according to this embodiment. In FIG. 2, a lens unit 150 is a lens unit in which a replaceable photographing lens is mounted. Although a lens 103 is generally configured using a plurality of lenses, here, for simplification, it is illustrated as only one lens. A communication terminal 6 is a communication terminal used for the lens unit 150 to communicate with the digital camera 100 side, and a communication terminal 10 is a communication terminal used for the digital camera 100 to communicate with the lens unit 150 side. The lens unit 150 communicates with a system control unit 50 through these communication terminals 6 and 10, controls a diaphragm 1 through a diaphragm driving circuit 2 using an internal lens system control circuit 4, and adjusts the focus by displacing the position of the lens 103 through an AF driving circuit 3.

The shutter 101 is a focal plane shutter capable of freely controlling an exposure time of an image capturing unit 22 under the control of the system control unit 50.

The image capturing unit 22 is an imaging element composed of a CCD or CMOS element, or the like that converts an optical image into an electric signal. The image capturing unit 22 may have an imaging surface phase difference sensor that outputs defocused amount information to the system control unit 50. An A/D converter 23 converts an analog signal into a digital signal. The A/D converter 23 is used for converting an analog signal output from the image capturing unit 22 into a digital signal. An image capturing unit according to the present invention has a function for generating image data by capturing an image of a subject. The image capturing unit 22 may be regarded as the image capturing unit according to the present invention or may be regarded to configure the image capturing unit together with peripheral constituent elements for generating image data such as the A/D converter 23, an image processing unit 24, and the like.

The image processing unit 24 performs resizing processing such as predetermined pixel interposition or reduction and color converting processing for data from the A/D converter 23 or data from a memory control unit 15. In addition, the image processing unit 24 performs predetermined calculation processing using captured image data. On the basis of calculation results acquired by the image processing unit 24, the system control unit 50 performs exposure control and distance measurement control. In accordance with this, auto-focus (AF) processing of a through the lens (TTL) type, automatic exposure (AE) processing, and flash pre-light emission (EF) processing are performed. The image processing unit 24 further performs predetermined calculation processing using captured image data and performs an auto white balance (AWB) processing of the TTL type on the basis of the acquired calculation results.

Output data from the A/D converter 23 is directly written into a memory 32 through the image processing unit 24 and the memory control unit 15 or through the memory control unit 15. The memory 32 stores image data which has been acquired by the image capturing unit 22 and has been converted into digital data by the A/D converter 23 and image data to be displayed in the display unit 28 and the EVF 29. The memory 32 has a storage capacity that is sufficient for storing a predetermined number of still images and videos and audios of a predetermined time.

In addition, the memory 32 also serves as a memory for image display (a video memory). A D/A converter 19 converts data for image display stored in the memory 32 into an analog signal and supplies the analog signal to the display unit 28 and the EVF 29. The image data for display written into the memory 32 in this way is displayed using the display unit 28 and the EVF 29 through the D/A converter 19. The display unit 28 and the EVF 29 perform display according to an analog signal from the D/A converter 19 for a display unit such as an LCD, an organic EL, or the like. Digital signals that have been A/D converted once by the A/D converter 23 and are accumulated in the memory 32 are converted into analog signals by the D/A converter 19, and the analog signals are sequentially transmitted to the display unit 28 or the EVF 29 and displayed therein, whereby live-view display (LV display) can be performed. Hereinafter, images displayed in the live-view will be referred to as a live-view image (LV image).

In the finder external display unit 43, various setting values of the camera including a shutter speed and a diaphragm are displayed through a finder external display unit driving circuit 44.

A non-volatile memory 56 is an electrically erasable/writable memory, and for example, an EEPROM or the like is used. In the non-volatile memory 56, constants, programs, and the like for operations of the system control unit 50 are stored. A program described here is a program for executing various flowcharts to be described below in this embodiment.

The system control unit 50 as a control unit is a control unit formed from at least one processor or one circuit and controls the whole digital camera 100. By executing a program recorded in the non-volatile memory 56 described above, each processing of this embodiment to be described below is realized. In a system memory 52, for example, a RAM is used, and constants and variables for operations of the system control unit 50, a program read from the non-volatile memory 56, and the like are expanded. In addition, by controlling the memory 32, the D/A converter 19, the display unit 28, and the like, the system control unit 50 performs display control as well.

A system timer 53 is a counting unit that measures times used for various controls and a time of a built-in clock.

The operation unit 70 is an operation means used for inputting various operation instructions to the system control unit 50. The mode changeover switch 60 is an operation member included in the operation unit 70 and switches the operating mode of the system control unit 50 to one of a still screen photographing mode, a video photographing mode, a reproduction mode, and the like. As modes included in the still screen photographing mode, there are an auto-photographing mode, an auto-scene judgement mode, a manual mode, a diaphragm priority mode (Av mode), a shutter speed priority mode (Tv mode), and a program AE mode (P mode). In addition, there are various scene modes, a custom mode, and the like in which photograph settings for respective photographing scenes are formed. By using the mode changeover switch 60, a user can directly switch to any one of such modes. Alternatively, after switching to a list screen of photographing modes is performed once using the mode changeover switch 60, one of a plurality of displayed modes is selected, and switching may be performed using another operation member. Similarly, also in the video photographing mode, a plurality of modes may be included.

During an operation of the shutter button 61 disposed in the digital camera 100, so-called a half pressing (a photographing preparation instruction), a first shutter switch 62 is turned on and generates a first shutter switch signal SW1. In accordance with the first shutter switch signal SW1, photographing preparation operations such as auto-focusing (AF) processing, automatic exposure (AE) processing, auto-white balance (AWB) processing, flash pre-light emission (EF) processing, and the like are started.

In completion of an operation of the shutter button 61, so-called a full pressing (a photographing instruction), a second shutter switch 64 is turned on and generates a second shutter switch signal SW2. In accordance with the second shutter switch signal SW2, the system control unit 50 starts a series of operations of photographing processing from reading a signal from the image capturing unit 22 to a time when a captured image is written in the recording medium 200 as an image file.

The operation unit 70 represents various operation members as an input unit accepting an operation from a user. In the operation unit 70, at least the following operation units are included. A shutter button 61, a main electronic dial 71, a power switch 72, a sub-electronic dial 73, a cross key 74, a set button 75, a video button 76, an AF lock button 77, an enlargement button 78, a reproduction button 79, a menu button 81, and a touch bar 82. The other operation member 70b collectively represents operation members that are not individually illustrated in the block diagram.

A power control unit 80 is composed of a battery detecting circuit, a DC-DC converter, a switch circuit switching blocks to be electrically conductive, and the like and detects presence/absence of installation of a battery, a type of battery, and a battery residual amount. In addition, the power control unit 80 controls the DC-DC converter on the basis of detection results thereof and an instruction from the system control unit 50 and supplies a required voltage to each of units including the recording medium 200 for a necessary period. A power supply unit 30 is formed from a primary battery such as an alkali battery or a lithium battery, a secondary battery such as a NiCd battery, a NiMH battery, or a Li battery, an AC adaptor, and the like.

A recording medium OF 18 is an interface for a recording medium 200 such as a memory card or a hard disk. The recording medium 200 is a recording medium such as a memory card used for recording a captured image and is composed of a semiconductor memory, a magnetic disk, and the like.

A communication unit 54 is connected using a radio or wired cable and transmits or receives a video signal and an audio signal. The communication unit 54 can be connected to a wireless local area network (LAN) and the Internet. In addition, the communication unit 54 can communicate with an external device also through Bluetooth (registered trademark) and Bluetooth Low Energy. The communication unit 54 can transmit an image captured by the image capturing unit 22 (including an LV image) and an image recorded in the recording medium 200 and can receive an image and other various kinds of information from external devices.

A posture detecting unit 55 detects a posture of the digital camera 100 with respect to the direction of gravity. On the basis of the posture detected by the posture detecting unit 55, it can be judged whether an image captured by the image capturing unit 22 is an image captured with the digital camera 100 being horizontally held or an image captured with the digital camera 100 being vertically held. The system control unit 50 can add direction information according to the posture detected by the posture detecting unit 55 to an image file of an image captured by the image capturing unit 22 or record an image with being rotated. As the posture detecting unit 55, an acceleration sensor, a gyro sensor, and the like can be used. By using the acceleration sensor and the gyro sensor, the posture detecting unit 55 can detect movement (pan, tilt, lifted-up, and being stopping or not) of the digital camera 100 as well.

An eye-contact detecting unit 57 is an eye-contact detecting sensor that detects an approach (eye contact)/separation (eye separation) of the eye (an object) to/from the eyepiece part 16 of the finder (approach detection). In accordance with a state detected by the eye-contact detecting unit 57, the system control unit 50 performs switching between display (a display state)/non-display (a non-display state) of the display unit 28 and the EVF 29. More specifically, at least in a photographing standby state and in a case in which switching of a display destination is automatic switching, during non-eye contact, display is on with the display destination set to the display unit 28, and the EVF 29 is set to non-display. In addition, during eye contact, display is on with the display destination set to the EVF 29, and the display unit 28 is set to non-display. The eye-contact detecting unit 57, for example, can use an infrared approach sensor and can detect an approach of a certain object to the eyepiece part 16 of the finder in which the EVF 29 is built. In a case in which an object approaches the eye-contact detecting unit 57, an infrared ray emitted from an emission part (not illustrated) of the eye-contact detecting unit 57 is reflected and is received by a reception part (not illustrated) of the infrared approach sensor. In accordance with an amount of the received infrared ray, it can be also judged whether an object is approaching up to a certain distance (eye-contact distance) from the eyepiece part 16. In this way, the eye-contact detecting unit 57 performs eye contact detection for detecting an approach distance of an object for the eyepiece part 16. In a case in which an object approaching the eyepiece part 16 within a predetermined distance is detected from a non-eye contact state (a non-approaching state), eye contact is assumed to be detected. In a case in which an object of which an approach has been detected becomes separate away by a predetermined distance or more from the eye contact state (approaching state), eye separation is assumed to be detected. A threshold for detecting eye contact and a threshold for detecting eye separation, for example, may be different from each other by arranging a hysteresis or the like. In addition, after detection of eye contact, an eye contact state is assumed until eye separation is detected. After eye separation is detected, a non-eye contact state is assumed until eye contact is detected. Here, the infrared approach sensor is an example, and any other sensor may be employed in the eye-contact detecting unit 57 as long as it can detect an approach of an eye or an object that can be regarded as eye contact.

The touch panel 70a and the display unit 28 may be integrally configured. For example, the touch panel 70a has transmittance of light configured not to interrupt display of the display unit 28 and is attached to an upper layer of a display face of the display unit 28. Then, input coordinates in the touch panel 70a and display coordinates in a display screen of the display unit 28 are associated with each other. In accordance with this, a graphic user interface (GUI) in which a user can directly operate a screen displayed on the display unit 28 can be provided. The system control unit 50 can detect the following operations or states for the touch panel 70a.

A finger or a pen not touching the touch panel 70a has been newly brought into contact with the touch panel 70a. That is, start of touch (hereinafter, referred to as a touch-down).

A state in which the touch panel 70a is touched by a finger or a pen (hereinafter, referred to as touch-on.

A finger or a pen is moving with being in touch with the touch panel 70a (hereinafter, referred to as touch-move).

A finger or a pen being in touch with the touch panel 70a has been separated therefrom. That is, an end of the touch (hereinafter, referred to as touch-up).

A state in which nothing is in touch with the touch panel 70a (hereinafter, referred to as touch-off).

When touch-down is detected, touch-on is simultaneously detected. After touch-down, unless touch-up is detected, generally, touch-on is continuously detected. A state in which touch-move is detected is a state in which touch-on is detected. Even when touch-on is detected, touch-move is not detected unless the touch position is moving. After detection of touch-up of all the fingers and the pen that have been in touch therewith, touch-off is formed.

Such an operation/state and position coordinates at which a finger or a pen is touching on the touch panel 70a are notified to the system control unit 50 through an internal bus. The system control unit 50 judges an operation (touch operation) that has been performed on the touch panel 70a on the basis of the notified information. Also for a movement direction of a finger or a pen moving on the touch panel 70a, touch-move can be judged for each vertical component/ horizontal component on the touch panel 70a on the basis of a change of the position coordinates. In a case in which touch move of a predetermined distance or more has been detected, it is judged that a sliding operation has been performed. An operation of quickly moving a finger by a distance of a certain degree with the finger being in touch on the touch panel and separating the finger as it is will be referred to as a flick. In other words, a flick is an operation of quickly tracing using a finger on the touch panel 70a for a flick. In a case in which a touch-move of a predetermined distance more with a predetermined speed or more is detected and a touch-up is detected as it is, it can be judged that a flick has been performed (it can be judged that there has been a flick after a sliding operation). Furthermore, a touch operation of touching a plurality of places (for example, two points) (as multi-touch) and approaching the touch positions thereof will be referred to as pinch-in, and a touch operation of separating the touch positions thereof will be referred to as pinch-out. The pinch-in and the pinch-out will be collectively referred to as a pinch operation (or simply pinch). The touch panel 70a may be of any type among various types of touch panels such as a resistive membrane type, a static capacity type, a surface acoustic wave type, an infrared ray type, an electromagnetic induction type, an image recognition type, an optical sensor type, and the like. Regarding the type, although there are a type in which presence of a touch is detected in accordance with presence of a contact with a touch panel and a type in which presence of a touch is detected in accordance with an approach of a finger or a pen to a touch panel, any type may be employed.

In addition, the system control unit 50 can detect the following operations or states for the touch bar 82.

A finger that has not been in contact with the touch bar 82 is newly in touch with the touch bar 82. That is, start of a touch (hereinafter, referred to as touch-down).

A state in which the touch bar 82 is being touched by a finger (hereinafter, referred to as touch-on).

A finger is moving with the touch bar 82 being in touched thereby (hereinafter, referred to as "touch-move").

A finger that has been in touch with the touch bar 82 is separated. That is, an end of a touch (hereinafter, referred to as "touch-up").

A state in which nothing is being in touch with the touch bar 82 (hereinafter, referred to as touch-off).

When touch-down is detected, touch-on is also being detected at the same time. After touch-down, generally, touch-on is continuously being detected unless touch-up is detected. Touch-move being detected is also a state in which touch-on is being detected. Even when touch-on is being detected, touch-move is not detected unless the touch position is being moved. After all the fingers and the pen that have been in touch are detected to be touched-up, touch-off is formed.

Such an operation/state and position coordinates at which a finger is being in touch on the touch bar 82 are notified to the system control unit 50 through an internal bus, and the system control unit 50 judges an operation (a touch operation) that has been performed on the touch bar 82 on the basis of the notified information. In touch-move, movement in the horizontal direction (a leftward/rightward direction) is detected on the touch bar 82. In a case in which movement of a predetermined distance or more has been detected, it is assumed to be judged that a sliding operation has been performed. An operation of touching the touch panel with a finger and separating the finger has been present within a predetermined time without performing a sliding operation, a tap operation is assumed to be judged. In this embodiment, the touch bar 82 is a touch sensor of the static capacitance type. However, the touch bar may be a touch sensor of another type such as a resistive membrane type, a surface acoustic wave type, an infrared type, an electromagnetic induction type, an image recognition type, or an optical sensor type.

In addition, in a case in which a finger is in touch with the touch panel, and touch-on is continued for a time longer than the predetermined time described above without performing a sliding operation, in the meaning that the touch panel is continuously pressed with the finger, processing in which touch-hold has been detected is performed.

Electronic Blur Correction

Figure 3A:
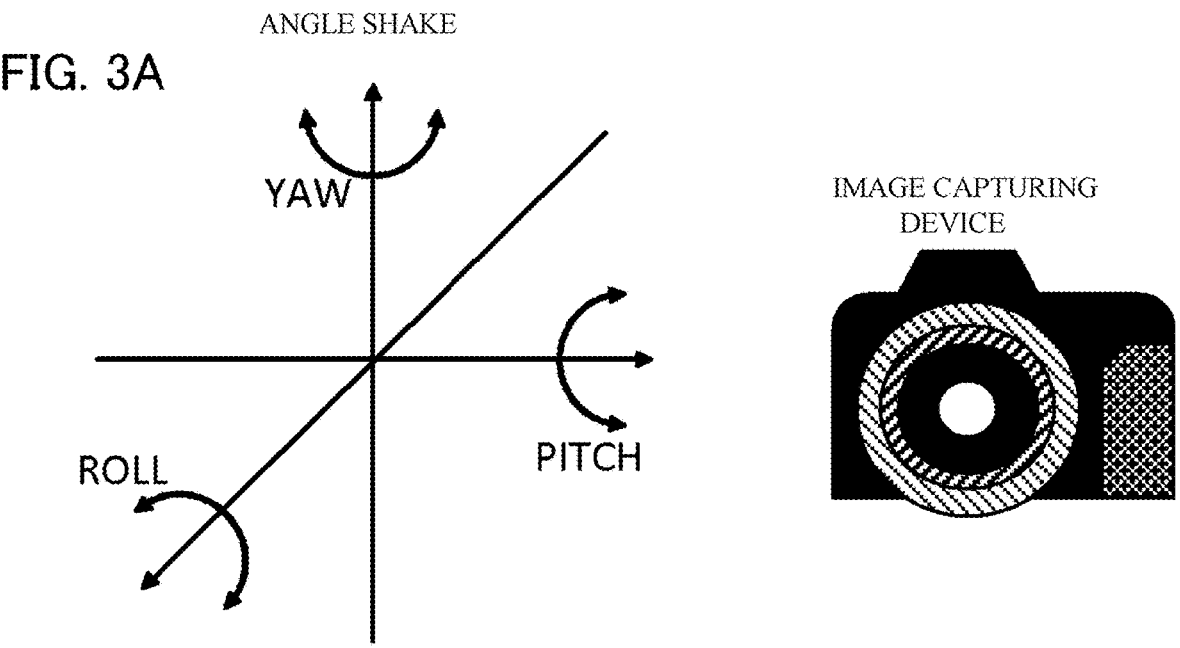
FIGS. 3A and 3B are diagrams for describing shake illustrating a structure of electronic shake correction.
Figure 3B:
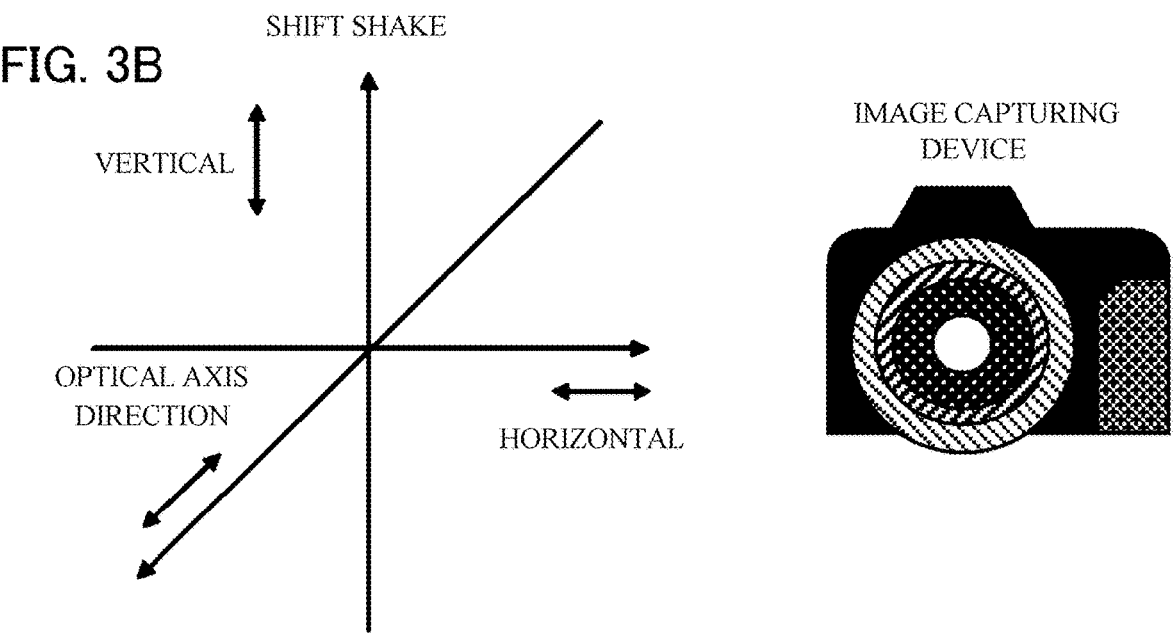
Figure 4A:
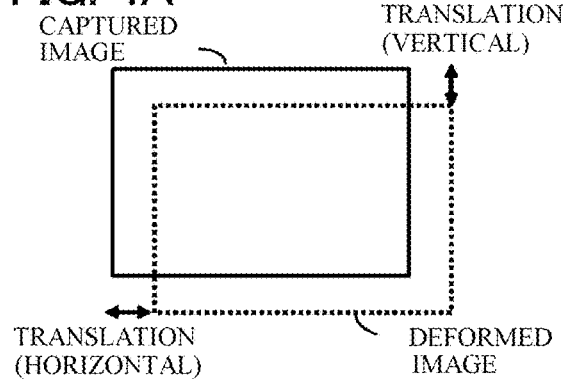
FIGS. 4A to 4F are diagrams for describing a shake illustrating a structure of electronic shake correction.
Figure 4B:
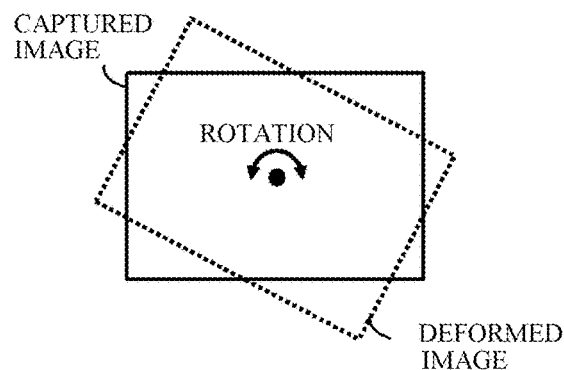
Figure 4C:
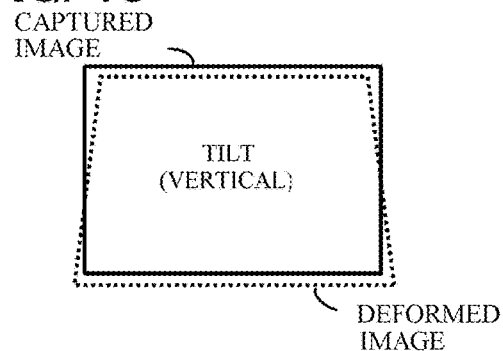
Figure 4D:
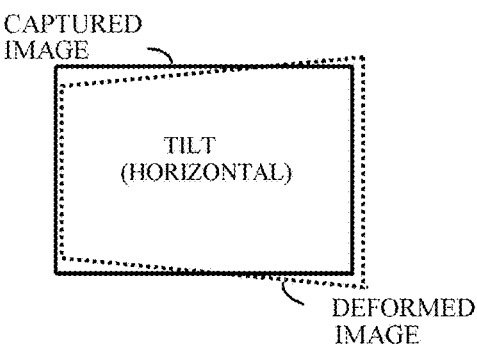
Figure 4E:
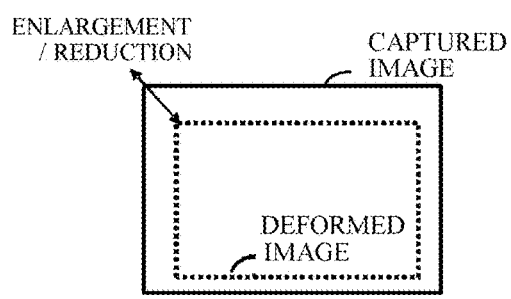
Figure 4F:
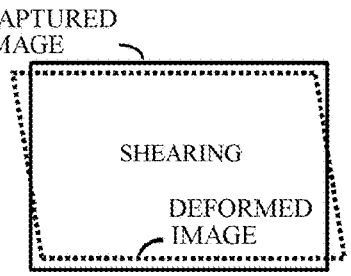

Here, electronic blur correction used in an embodiment of the present invention will be described. First, definitions of terms used in the electronic blur correction will be described. In description of the electronic blur correction, a vibration applied to an image capturing device will be referred to as a "shake", and deformation of a captured image occurring due to a shake applied to an image capturing device will be referred to as "blur". A "shake" in the electronic blur correction, as illustrated in FIGS. 3A and 3B, collectively means "angle shakes" of three types of yaw, pitch, and roll directions and "parallel shakes" (shift shakes) of three types of a horizontal, a vertical, and an optical axis directions. In addition, as illustrated in FIGS. 4A to 4F, "blur" collectively means deformation components of (horizontal/vertical) translations, rotation, (horizontal/vertical) tilts, enlargement/reduction, and shearing.

In electronic blur correction, the system control unit 50 dissolves an amount of deformation occurring in a captured image due to a shake into deformation components of (horizontal/vertical) translations, (horizontal/vertical) tilts, enlargement/reduction, rotation, and shearing. Then, the system control unit 50 performs filtering processing and the like on each deformation component, calculates a projective transformation matrix (a homography matrix), and uses the projective translation matrix for calculation of a correction amount. For this reason, in accordance with a method for calculation, there are cases in which a range of an image that can be finally output decreases.

Figure 5:
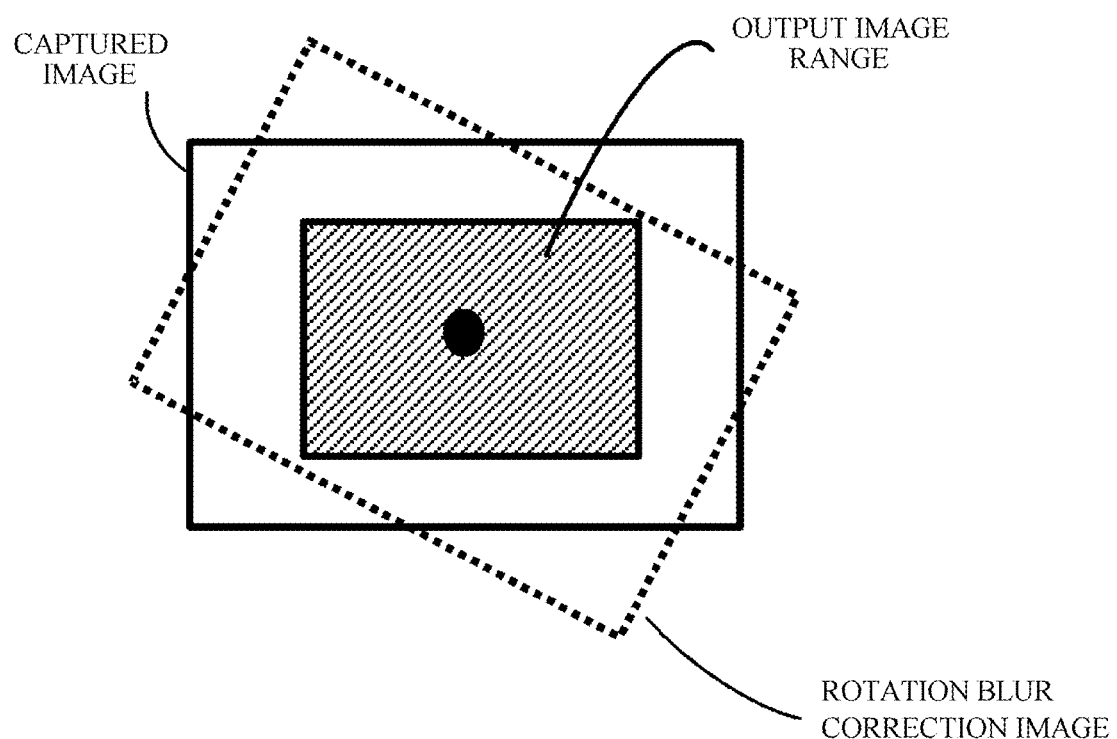
FIG. 5 is a diagram for describing image shake correction illustrating a structure of electronic shake correction.

For example, FIG. 5 illustrates an example of image shake correction according to image deformation at the time when the image capturing device rotates around an optical axis. An outer solid line part of FIG. 5 is a captured image, and, in order to correct rotation around the optical axis, the captured image is rotated around an image center O as its center. A result of the rotation is an image of a dotted line part illustrated in FIG. 5. At this time, when an output image is set to a range as that of the captured image, a state in which there is no image at four corners of the image is formed, and thus an output image range becomes an area denoted by a hatched area of FIG. 5. In FIG. 5, although correction of rotation around the optical axis has been described as an example, for each deformation component other than that, it is necessary to secure an image area that cannot be output for each deformation component (hereinafter, defined as surplus pixels).

In this way, in order to calculate electronic blur correction, the image range needs to be decreased. An image of which image range has been decreased in advance for calculating electronic blur correction will be set as a crop image.

On the basis of the description presented above, hereinafter, user interfaces in a general video capturing mode and a video capturing mode of which an angle-of-view is narrowed (hereinafter, referred to as a camera shake correction mode) will be described.

FIGS. 6 to 12C are screen shots displayed in the display unit 28. FIGS. 13 to 17 are flowcharts relating to the user interfaces described above and thus will be described after combinations with FIGS. 6 to 12C.

FIG. 13 illustrates a flowchart relating to a general video capturing mode.

In Step S501, the system control unit 50 changes the setting of the electronic camera shake correction to "off". Setting of the camera shake correction to "off" represents that calculation of the electronic blur correction described above is not performed. Then, the processing proceeds to Step S502. In addition, hereinafter, the camera shake correction will be also referred to as "IS: image stabilization", and, for example, the setting of the electronic camera shake correction to off will be also denoted as "electronic IS: off".

In Step S502, the system control unit 50 displays a live-view image with a first angle-of-view in the display unit 28 of the digital camera 100. The first angle-of-view in this example represents a state in which no cropping is performed as illustrated in FIG. 12C. Image display with the first angle-of-view will be referred to as first angle-of-view display.

Figure 6:
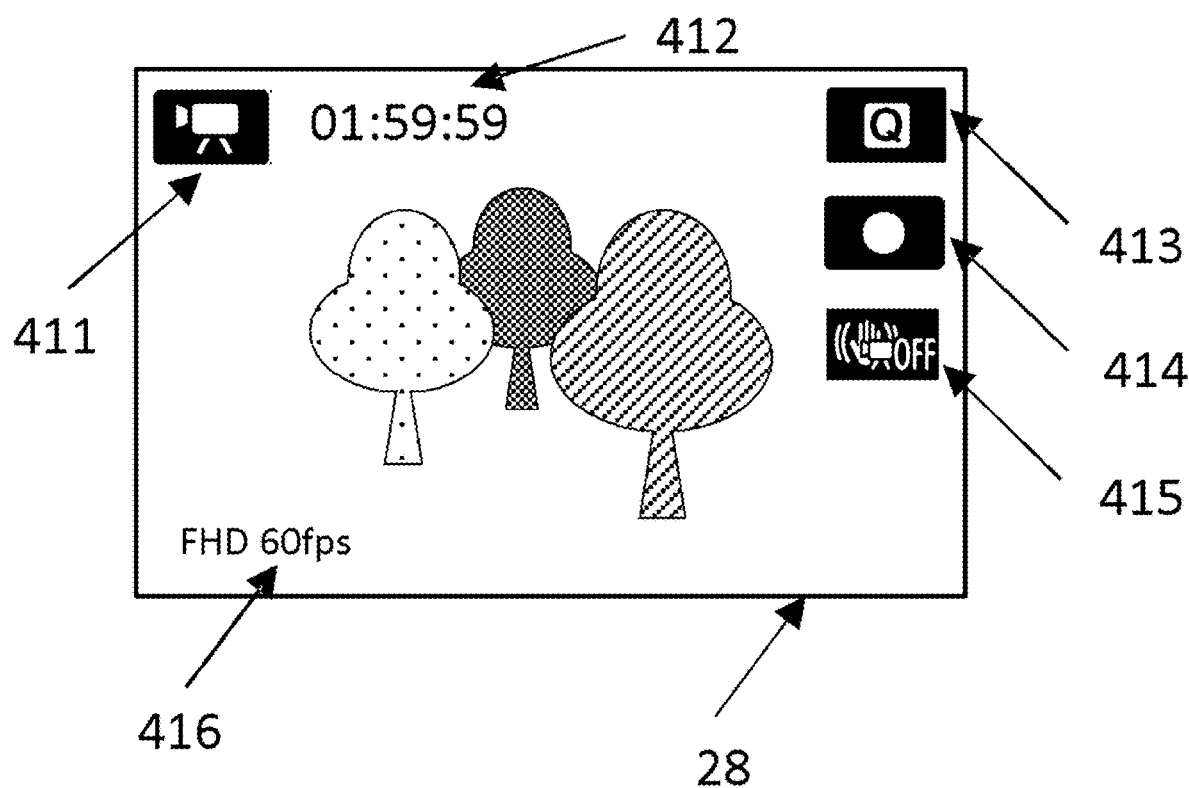
FIG. 6 is a diagram illustrating a standby screen of a normal mode on a screen of a display unit.
Figure 7:
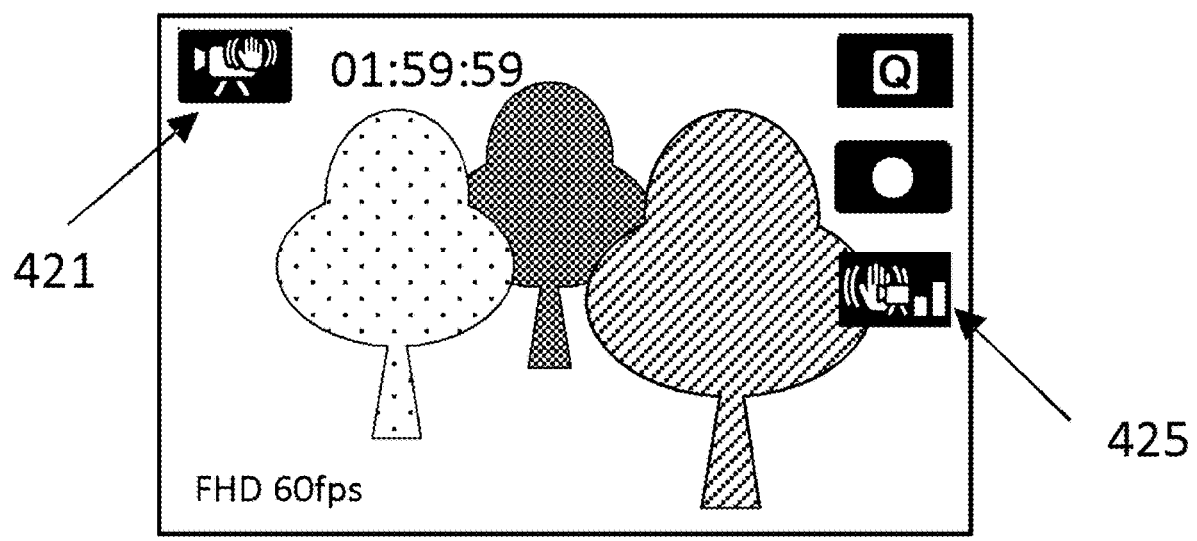
FIG. 7 is a diagram illustrating an example of a display unit at the time of non-self photographing.

In addition, a specific display example overlapping the live-view image at this time is FIG. 6. A video mode item (general) 411 is an index representing the current video mode (the general video mode) and is a GUI item that can be touched for changing the video mode. A photographing possible time display 412 displays a time at which a video can be photographed. A quick menu item 413 is a GUI item that can be touched for a transition to a quick menu used for performing various kinds of photographing relating to video photographing. In the quick menu, for example, a recording size and the like can be changed. A video start button 414 is a GUI item that can be touched for starting video recording. When this part is touched, video recording starts. A correction situation item (off) 415 can be touched for changing the settings of the electronic camera shake correction and is a GUI item used for representing information of a setting status (electronic IS: off) of the current camera shake correction setting. A recording size item 416 is information display of a recording size. Then, the processing proceeds to S503.

In Step S503, the system control unit 50 judges whether or not an operation of selecting the camera shake correction mode as the photographing mode has been performed. The operation of selecting the camera shake correction mode described above represents whether or not the GUI item (reference sign 411) described above has been touched, the camera shake correction mode on a previous mode selection screen has been selected. In a case in which the operation of selecting the camera shake correction mode has been performed, the processing proceeds to Step S504. Otherwise, the processing proceeds to Step S505.

In Step S504, the system control unit 50 performs camera shake correction mode processing. Details thereof will be described below. Then, the processing proceeds to Step S509.

In Step S505, the system control unit 50 judges whether or not the video start button 414 has been selected, in other words, whether or not a video recording start instruction has been received from an operator. In a case in which the video start button 414 has been selected, the processing proceeds to Step S506. Otherwise, the processing proceeds to Step S507.

In Step S506, the system control unit 50 performs video recording processing. Details thereof will be described below. Then, the processing proceeds to Step S509.

In Step S507, the system control unit 50 judges whether or not a setting change operation relating to a video has been performed. The setting change includes a change of a video recording size and the like that is performed in accordance with an operation on the quick menu item 413. In a case in which the setting change operation has been performed, the processing proceeds to Step S508. Otherwise, the processing proceeds to Step S509.

In Step S508, the system control unit 50 performs setting processing. For example, the setting processing changes the setting from the current video recording size to a different size. In addition, a size after the change is displayed in the display unit 28 together with the recording size item 416 described above.

Then, the processing proceeds to Step S509.

In Step S509, the system control unit 50 judges whether to end the video mode or not. In a case in which the video mode ends, the processing ends. On the other hand, in a case in which the video mode does not end, the processing returns to Step S503.

FIG. 14 illustrates a flowchart relating to the camera shake correction mode in Step S504.

In Step S601, the system control unit 50 changes the setting of the electronic camera shake correction to strong. The setting of the electronic camera shake correction to strong represents that the calculation of the electronic blur correction described above is performed. Then, the processing proceeds to Step S602.

In Step S602, the system control unit 50 displays a live-view image with a second angle-of-view in the display unit 28 of the digital camera 100. In this example, the second angle-of-view is a state illustrated in FIG. 12A described above. Image display with the second angle-of-view will be referred to as second angle-of-view display. In a specific display example of items overlapping the live-view image illustrated in FIG. 7, differences from that illustrated in FIG. 6 will be described. A video mode item (camera shake correction) 421 is an index representing the current video mode (the hand shake correction mode) and is a GUI item that can be touched for changing the video mode. A correction status item (strong) 425 can be touched for changing the setting of the electronic camera shake correction and is a GUI item for representing information of the setting status (electronic IS: strong) of the current camera shake correction setting. Then, the processing proceeds to Step S603.

In Step S603, the system control unit 50 judges whether or not an operation of selecting the general video mode as the photographing mode has been performed. The operation of selecting the general video mode described here is whether or not the GUI item (reference sign: 411) described above has been touched, and the general video mode has been selected on the previous mode selection screen. In a case in which the operation of selecting the general video mode has been performed, the processing proceeds to Step S604. Otherwise, the processing proceeds to Step S605.

In Step S604, the system control unit 50 performs the general video mode processing. Details thereof are as illustrated in FIG. 13. Then, the processing proceeds to Step S613.

Step S605 is processing similar to Step S505 described above, and thus description thereof will be omitted.

In a case in which the video start button is selected, the processing proceeds to Step S606. Otherwise, the processing proceeds to Step S607.

Step S606 is processing similar to Step S506 described above, and thus description thereof will be omitted. Then, the processing proceeds to Step S613.

In Step S607, the system control unit 50 judges whether or not the image capturing device comes in a specific state, more specifically, a variable angle self-photographing state. Here, it is judged whether or not the display unit 28 (a face of the touch panel 70a) is directed from a photographer side to a subject side (image capturing direction). As one example of judgement of the self-photographing state, there is a method in which a direction in which the lens of the lens unit 150 is directed, that is, the direction in which image capturing is performed and a direction of the display face of the display unit 28 are approximately the same direction. In addition, the imaging direction and the display face "being approximately the same direction" does not require precisely the same angle but may represent a range in which a subject positioned in the imaging direction is displayed on the display face. In a case in which the display unit is directed from the photographer side to the subject side, the processing proceeds to Step S608. Otherwise, the processing proceeds to Step S613. In addition, the method for changing the display unit 28 on the subject side and the photographer side is not limited to the variable angle type but may be a tilt type or the like.

Figure 8:
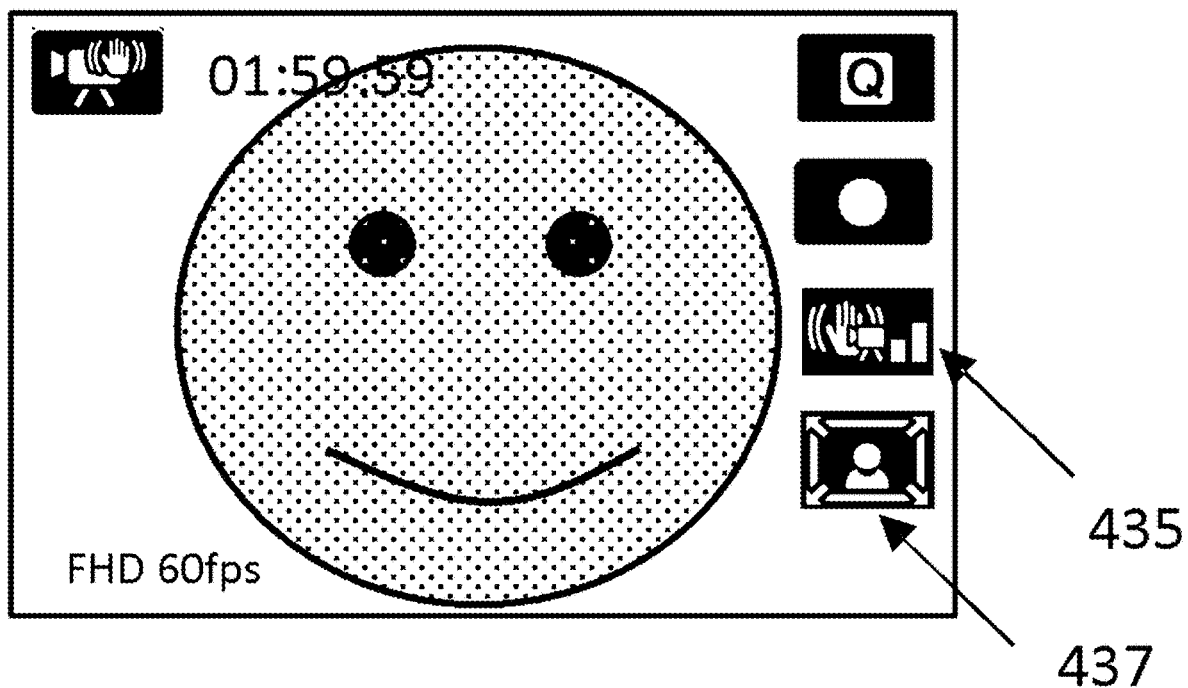
FIG. 8 is a diagram illustrating an example of a display unit at the time of self-photographing.
Figure 9:
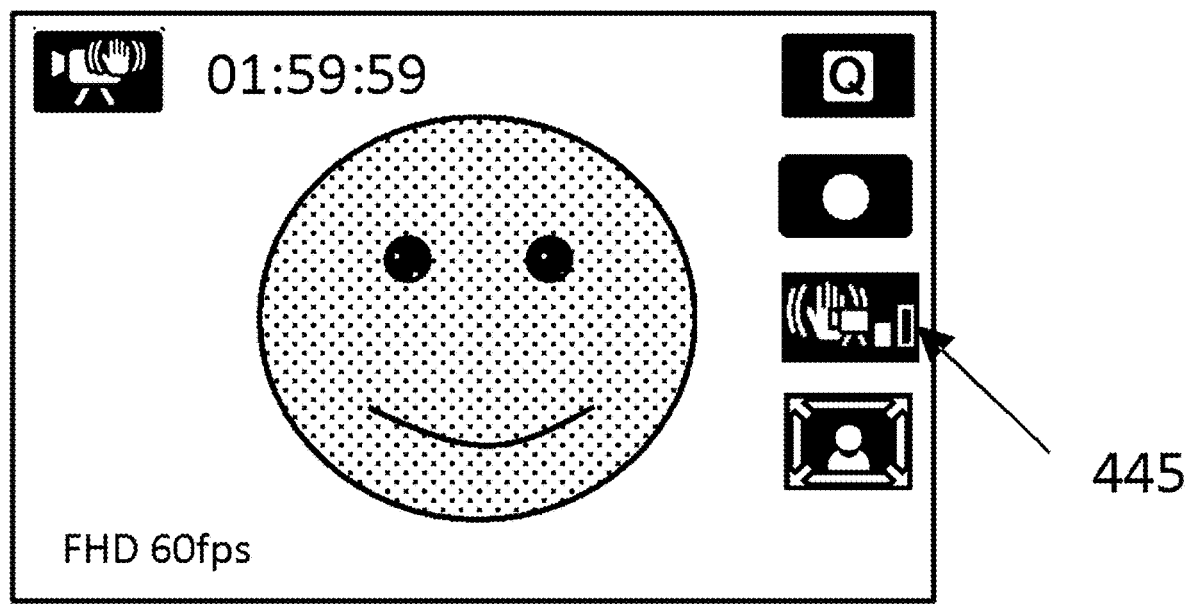
FIG. 9 is a diagram illustrating an example of a display unit at the time of self-photographing.

In Step S608, the system control unit 50 displays an item that can be touch-operated for being able to give an instruction for instantly broadening the angle-of-view on the display unit 28. A display example of an item described here is a wide-angle instruction item 437 illustrated in FIG. 8, and the wide-angle instruction item is configured to overlap the live-view image and is displayed on an end part side of the screen so as not to interrupt checking of the live-view. Then, the processing proceeds to Step S609. A correction status item 435 (strong) illustrated in FIG. 8 is the same display as in FIG. 7.

In Step S609, the system control unit 50, in a state in which a touch operation of the wide-angle instruction item 437 described above is effective, judges whether or not a touch operation has been performed on the wide-angle instruction item 437. In a case in which a touch operation has been performed on the wide-angle instruction item 437 described above in a touch operation-effective state, the processing proceeds to Step S610. Otherwise, the processing proceeds to Step S613.

Figure 10:
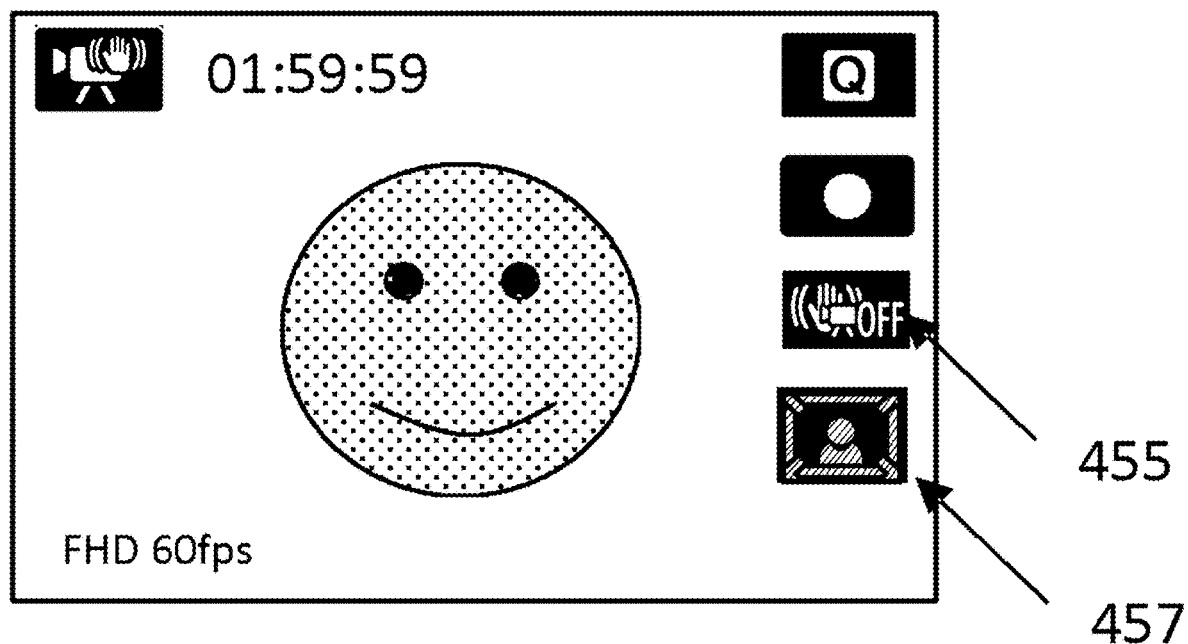
FIG. 10 is a diagram illustrating an example of a display unit at the time of self-photographing.

In Step S610, the system control unit 50 changes the setting of the electronic camera shake correction to off. At this time, as in the display example illustrated in FIG. 10, the display unit 28 changes the current setting status of the camera shake correction setting from the correction status item (strong) 435 to a correction status item (off) 455. Here, the correction status item (off) 455 illustrated in FIG. 10 is the same display of FIG. 6. Then, the processing proceeds to Step S611.

In Step S611, as in Step S502 described above, the system control unit 50 displays a live-view image with the first angle-of-view on the display unit 28 of the digital camera 100. Then, the processing proceeds to Step S612.

In Step S612, the system control unit 50 changes the wide-angle instruction item 437 described above to a non-effective display, that is, a state in which a touch operation cannot be performed. A display example at this time is represented using a wide-angle instruction item (non-effective) 457 illustrated in FIG. 10. The wide-angle instruction item 437 is an item for allowing instant wide-angle setting in an easy manner. For this reason, if the wide-angle instruction item 437 is effective and is configured as a touch item toggling between a current angle-of-view and a wide angle, there is also a disadvantage that, when it is instantly operated in a holding operation, the angle-of-view returns to the original angle-of-view due to an erroneous operation, and a photographing chance may be missed. Thus, it is preferable that the wide-angle instruction item (non-effective) 457 be displayed, and the instruction is caused to be in a non-effective state. Then, the processing proceeds to Step S613.

Step S613 is processing similar to that of Step S509 described above, and thus description thereof will be omitted.

FIG. 15 is a flowchart relating to a camera shake correction mode of control different from that illustrated in FIG. 14.

Steps S701 to S703 are processing operations similar to those of Steps S601 to S603 described above, and thus description thereof will be omitted.

Step S704 is processing similar to that of Step S605 described above, and thus description thereof will be omitted. Then, the processing proceeds from Step S704 to Step S714.

Steps S705 and S706 are processing operations similar to those of Steps S605 and S606 described above, and thus description thereof will be omitted. Then, the processing proceeds from Step S706 to Step S714.

In Step S707, the system control unit 50 judges whether the variable angle state has been changed, in other words, whether or not the state of the display unit 28 (the face of the touch panel 70a) has been changed. In a case in which the state of the display unit 28 (the face of the touch panel 70a) has been changed, the processing proceeds to Step S708. Otherwise, the processing proceeds to Step S714.

In Step S708, it is judged whether the variable angle self-photographing state is formed, in other words, whether or not the display unit 28 has been directed from the photographer side to the subject side (an imaging direction). In a case in which the display unit 28 has been directed from the photographer side to the subject side, the processing proceeds to Step S709. Otherwise, the processing proceeds to Step S712.

In Step S709, the system control unit 50 judges whether or not a size of a face of a person in an image exceeds a predetermined size for the second angle-of-view. At this time, the system control unit 50, for example, can perform the judgement by detecting a face area using known image recognition processing and comparing the face area with the size of an image for the second angle-of-view. A threshold used at the time of comparison may be arbitrary set. The size of a face may be judged on the basis of a ratio of the face area to the image size. In a case in which the size of the face exceeds a predetermined size for the second angle-of-view, the processing proceeds to Step S710. Otherwise, the processing proceeds to Step S714.

In Step S710, the system control unit 50 changes the setting of the electronic camera shake correction to off. Then, the processing proceeds to Step S711.

In Step S711, the system control unit 50, as in Step S502 described above, a live-view image is displayed with the first angle-of-view in the display unit 28 of the digital camera 100. Then, the processing proceeds to Step S714.

In Step S712, the system control unit 50 changes the setting of the electronic camera shake correction to strong.

In Step S713, the system control unit 50, as in Step S602 described above, displays a live-view image with the second angle-of-view on the display unit 28 of the digital camera 100. Then, the processing proceeds to Step S714.

Step S714 is processing similar to that of Step S509 described above, and thus description thereof will be omitted.

Figure 11:
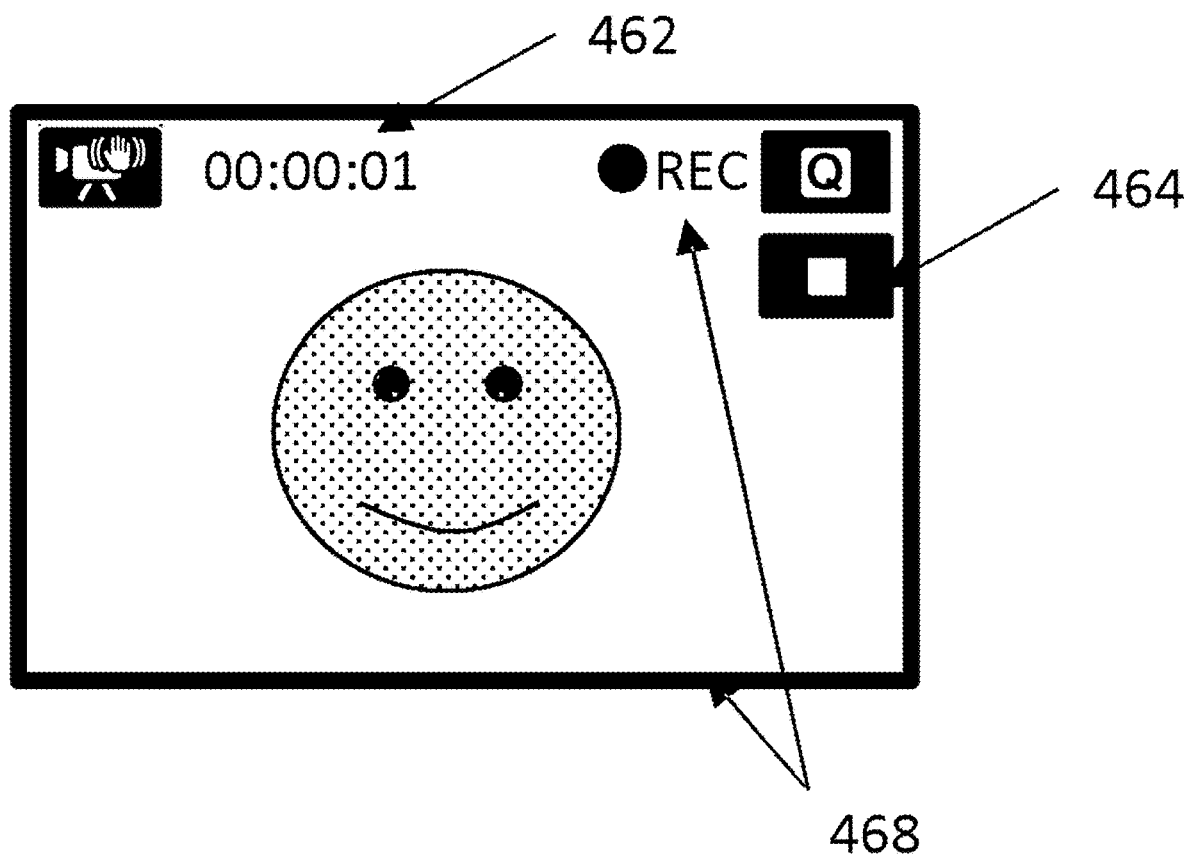
FIG. 11 is a diagram illustrating an example of a display unit during video recording.
Figure 16:
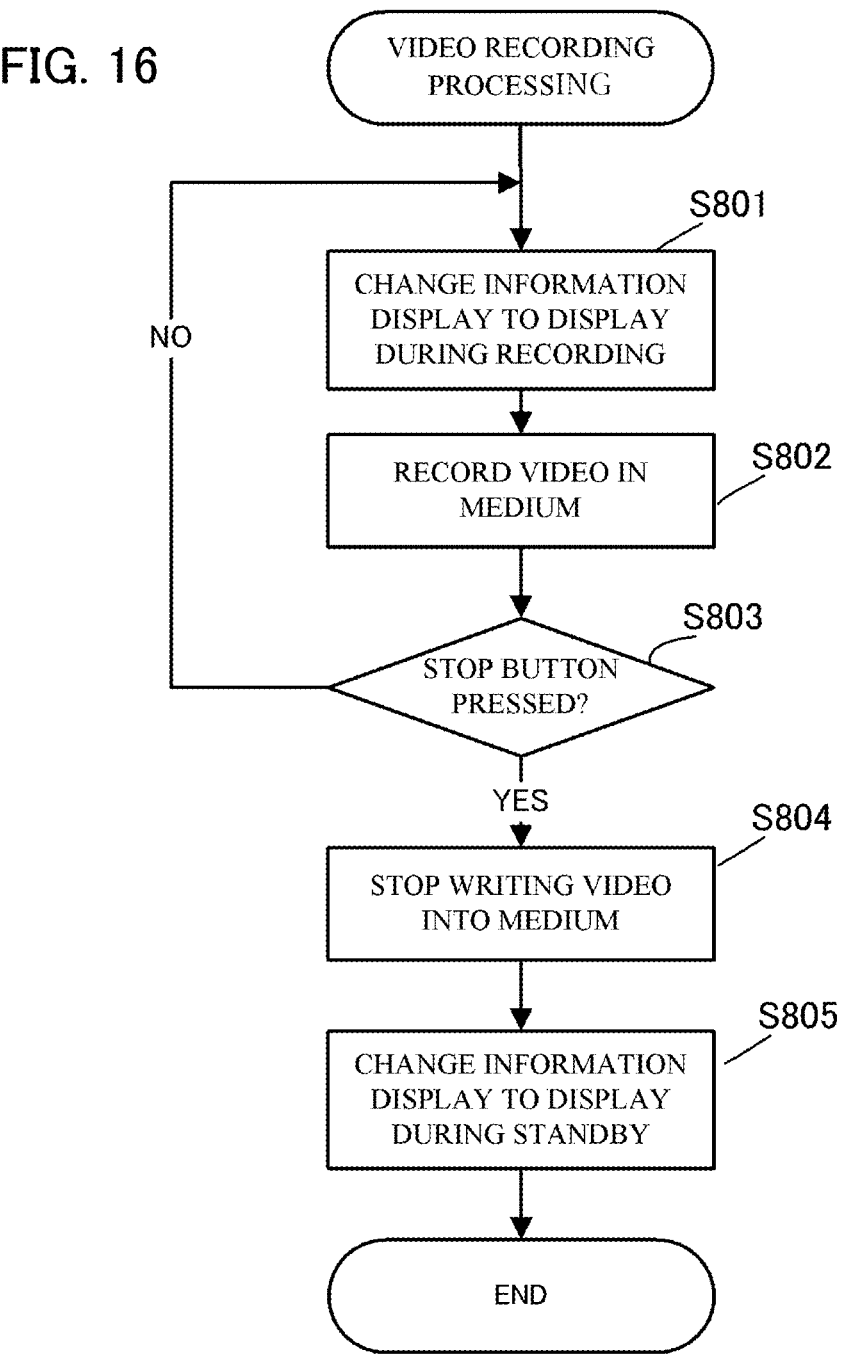
FIG. 16 is a flowchart during video recording.

FIG. 16 illustrates a flowchart relating to video recording processing. In Step S801, the system control unit 50 changes the state of the display unit 28 to display during video recording. At this time, the angle-of-view of the live-view is not changed. An example of the display during video recording is illustrated in FIG. 11. A during-recording count display 462 is a count display during recording. During recording of a video, a photographing possible time display 412 is changed to the during-recording count display 462. A video stop button 464 is a GUI item that can be touched for stopping video recording. When this part is touched, video recording stops. During recording of a video, the video start button 414 is changed to the video stop button 464. A during-recording display 468 is a guide display indicating it is during recording a video. For example, the during-recording display is an icon denotation of "REC" and/or a red frame display on the periphery of the display unit 28. In addition, items, which have been displayed in a video standby state, not required during recording of a video (for example, the correction status item (strong) 435, the wide-angle instruction item 437, the recording size item 416, and the like) are set to non-display, and the processing proceeds to Step S802.

In Step S802, the system control unit 50 records a video in the recording medium 200. Then, the processing proceeds to Step S803.

In Step S803, the system control unit 50 judges whether or not a video recording stop instruction has been operated (for example, the video stop button 464 has been touched). In a case in which the stop instruction has been operated, the processing proceeds to Step S804. Otherwise, the video recording is continued. In Step S804, the system control unit 50 stops the video recording for the recording medium 200. Then, the processing proceeds to Step S805.

In Step S805, the system control unit 50 changes the state of the display unit 28 to display of the video standby screen. More specifically, the during-recording count display 462 is set to non-display, the display is returned to the photographing possible time display 412, and the video start button 414 is displayed, and the like. Then, the video recording processing ends.

Figure 17:
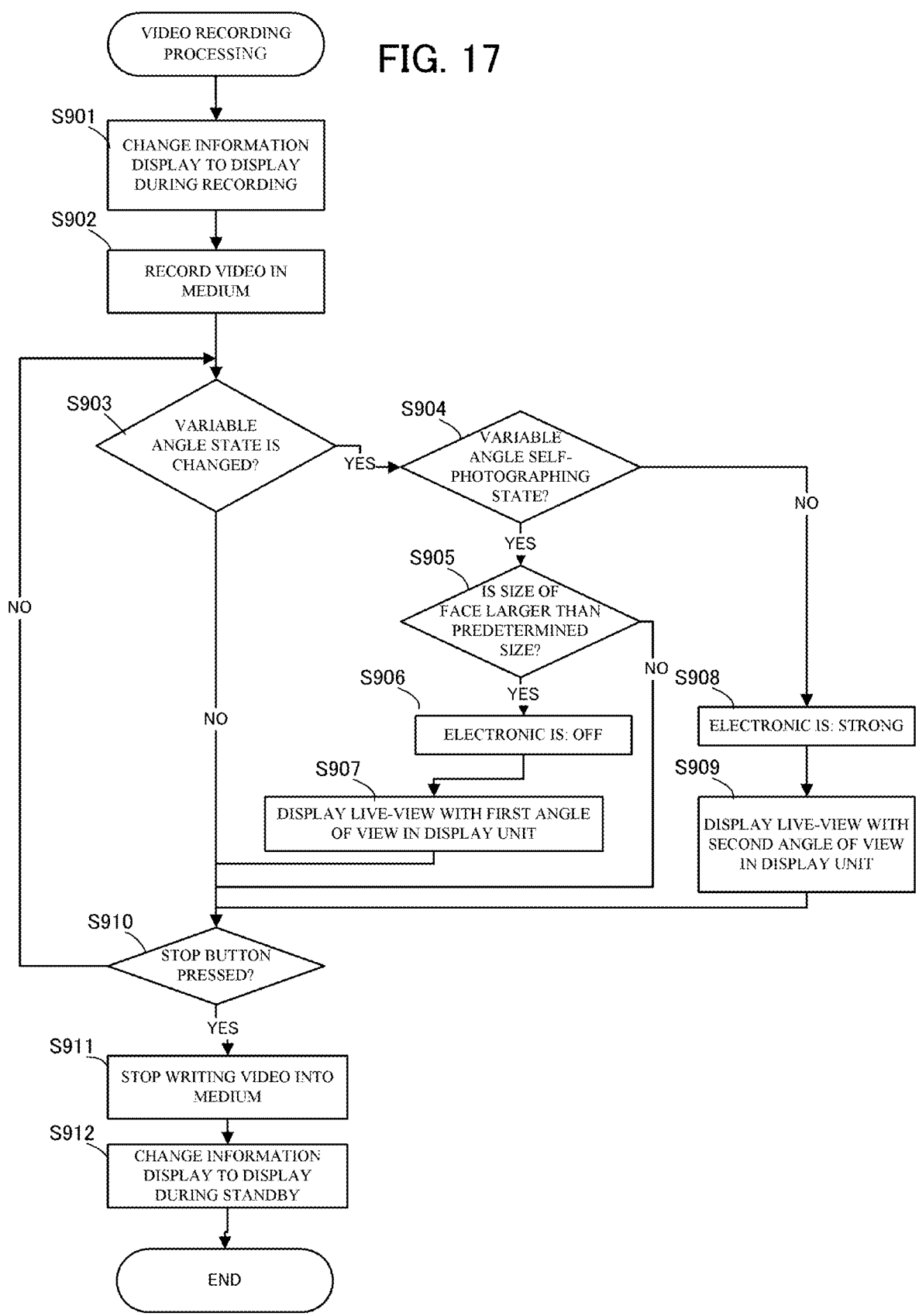
FIG. 17 is a flowchart during video recording.

FIG. 17 illustrates a flowchart relating to processing during video recording of a case different from that of FIG. 16 described above.

Steps S901 and S902 are processing operations similar to those of Steps S801 and S802 described above, and thus description thereof will be omitted. Then, the processing proceeds to Step S903.

Steps S903 to S909 are processing operations similar to those of Steps S708 to S713 described above, and thus description thereof will be omitted. Then, the processing proceeds to Step S903.

Steps S910 to S912 are processing operations similar to those of Steps S803 to S805 described above, and thus description thereof will be omitted. Then, the video recording processing ends.

In other words, in the flow illustrated in FIG. 17, it is judged whether or not the direction of the display unit has been changed during video recording, and, in a case in which the direction has been changed, it is judged whether or not the electronic camera shake correction is to be set to off in accordance with the size of a face in the image. In accordance with this, for example, when the variable angle state has been changed to a self-photographing state during recording of a video, the angle-of-view can be changed to a wide angle.

As described above, in accordance with execution of the flows illustrated in FIGS. 13 to 17, even in a state in which the photograph angle-of-view is narrowed through the electronic camera shake correction, a photograph angle-of-view can be widened at a necessary time using a simple operation method.

Modified Example 1

In a case in which a touch operation is performed on the wide-angle instruction item 437 for widening angle-of-view in Steps S609 to S612 illustrated in FIG. 14, the setting of the electronic camera shake correction is changed to off, and an image having no crop as illustrated in FIG. 12C is displayed. Then, in order to prevent an erroneous operation, the item display is changed to the wide-angle instruction item (non-effective) 457. In other words, in the description presented above, the first angle-of-view display is a state illustrated in FIG. 12C, and the second angle-of-view display is a state illustrated in FIG. 12A. However, at the time of performing a touch operation, the setting of the electronic camera shake correction may be set as weak (although the setting of the camera shake correction is effective, the strength of correction is intermediate that is between "strong" and "off"). The display at this time is represented as a correction status item (weak) 445 illustrated in FIG. 9. The strength of correction being in correspondence with "weak" is the state illustrated in FIG. 12B. By configuring as such, a request for slightly widening an angle-of-view such that a face enters a photographing range and configuring camera shake correction processing to be slightly effective can be responded. In addition, the strength of the electronic camera shake correction is in three levels, and thus, when a touch operation is performed, a rapid change in the angle-of-view does not occurs, and a sense of security can be provided for a user. In the case of this Modified example 1, the first angle-of-view display is a state illustrated in FIG. 12B, and the second angle-of-view display is a state illustrated in FIG. 12A. In addition, in the case of Modified example 1, a state illustrated in FIG. 12C may be referred to as a third angle-of-view display in which an image is displayed with a third angle-of-view.

Modified Example 2

In addition, in the judgement of Step S607, it may be judged whether or not a wide-angle lens is mounted in the image capturing device. Then, in addition to the state being the self-photographing state, in a case in which a wide-angle lens is not mounted, the processing may proceed to Step S608, and the wide-angle instruction item 437 may be displayed. The wide-angle lens described above, for example, is a case in which the focal distance is 18 mm or less or the like at the time of conversion in terms of 35 mm, and in a case in which the focal distance is this predetermined value or less, a wide-angle lens is judged. However, the focal distance is not limited to this numerical value, and whether or not a mounted lens is a wide-angle lens may be arbitrarily designed in accordance with characteristics of the image capturing device. The reason for this is that, even in the camera shake correction mode in which the photograph angle-of-view is narrowed, when a wide-angle lens is mounted, the angle-of-view is originally a wide angle, and thus there is a likelihood of the face of the photographer entering inside the angle-of-view. In this case, it is more convenient for a user to set the wide-angle instruction item 437 to non-display such that the checking of a live-view is not interrupted as possibly for allowing a live-view to be easily seen.

Modified Example 3

In addition, in this embodiment, in a case in which the general video mode is selected, the setting of the electronic camera shake correction is "off" as an initial value, and an image is displayed with the first angle-of-view. On the other hand, in a case in which the hand shake correction mode is selected, the setting of the electronic camera shake correction is "strong" as its initial value, and an image is displayed with the second angle-of-view. However, the control is not limited thereto. Here, the change of the setting of the electronic camera shake correction may be performed using a setting unit (for example, a setting item of the electronic camera shake correction disposed inside a menu display of the image capturing device) other than the touch operation of the correction status item 415. In addition, in a case in which the setting has been changed from the menu, the wide-angle instruction item 437 for widening the angle-of-view may not be displayed. By configuring as such, the number of items displayed on the live-view can be decreased as possible. In addition, a case in which the setting of the camera shake correction is changed from the menu of the image capturing device in advance is assumed not to be a situation in which the angle-of-view is instantly changed. For this reason, there are many cases in which the degree of necessity for displaying the wide-angle instruction item 437 is low, and thus a case in which a live-view can be seen more easily may be prioritized.

In addition, this embodiment has been described on the premise that the image capturing device is a camera. However, the image capturing device may be a smartphone. In such a case, the present invention may be applied such that photographing using an outer camera is general photographing, and photographing using an inner camera is in a self-photographing state.

As described above, by executing the flows illustrated in FIGS. 13 to 17, even in a state in which a photograph angle-of-view is narrowed in accordance with the electronic camera shake correction and in case of a photographing scene in which the angle-of-view is desired to be widened instantly, the photograph angle-of-view can be widened using a simple method. In addition, in this flow, the angle-of-view can be widened only at a necessary time. For example, a use method in which, in a case in which a photographing subject enters the angle-of-view, the camera shake correction processing is prioritized without widening the angle-of-view can be used, and thus there is an advantage that it can be conveniently used for a wide range of photographing scenes.

In addition, various control operations described to be performed by the system control unit 50 may be performed by one piece of hardware, or control of the whole device may be performed by a plurality of pieces of hardware (for example, a plurality of processors or circuits) sharing the processing.

Furthermore, as the processing of the embodiment described above, a storage medium in which program codes of software implementing each function are recorded may be provided for a system or a device. Then, the various control operations described above described to be performed by a computer of the system or the device may be performed by one piece of hardware, and the whole device may be controlled by a plurality of pieces of hardware (for example, a plurality of processors or circuits) sharing the processing. The present invention may be regarded as a program causing a computer to function as each means of the image capturing device described in the embodiment described above. In addition, the present invention may be regarded as a computer-readable storage medium in which a program for causing a computer to function as each means of the image capturing device described in the embodiment described above is stored.

In addition, although the present invention has been described in detail on the basis of the preferred embodiment, the present invention is not limited to such specific embodiments, and various forms in a range not departing from the concept of the present invention also belong to the present invention. Furthermore, each embodiment described above merely represents one embodiment of the present invention, and embodiments can be appropriately combined.

In addition, in the embodiment described above, although a case in which the present invention is applied to a digital camera has been described as an example, this is not limited to this example, and the present invention can be applied to a display device capable of display a plurality of images and a display control device for which a touch input can be performed. In other words, in addition to the smartphone described above, the present invention can be applied to a personal computer, a PDA, a mobile phone terminal, a portable-type image viewer, a printer device provided with a display, a digital photo frame, a music player, a game device, an electronic book reader, and the like.

Other Embodiment

A program implementing one or more functions of the embodiment described above is supplied to a system or a device through a network or a storage medium, and the present invention can be realized also in processing in which a program is read and executed by one or more processors in a computer of the system or the device. In addition, the present invention can be realized also using a circuit (for example, an ASIC) realizing one or more functions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-145556, filed on Sep. 13, 2022, which is hereby incorporated by reference wherein in its entirety.

What is claimed is:

1. An image capturing device comprising:
an image capturing unit; and
a control unit configured to perform control such that an image captured by the image capturing unit is displayed on a display unit, wherein
the control unit is able to perform first angle-of-view display displaying the image with a first angle-of-view on the display unit and second angle-of-view display displaying the image with a second angle-of-view narrower than the first angle-of-view on the display unit by performing camera shake correction on the image,
in a case in which the image capturing device comes into a specific state when the second angle-of-view display is performed, the control unit displays an item for changing from the second angle-of-view display to the first angle-of-view display on the display unit,
the control unit is able to perform third angle-of-view display displaying the image on the display unit with a third angle-of-view wider than the first angle-of-view, and
the first angle-of-view display is display performed when hand shake correction, the strength of which is weaker than that of the camera shake correction at the time of the second angle-of-view display, is performed, and the third angle-of-view display is display performed when the camera shake correction is not performed.

2. The image capturing device according to claim 1, wherein the specific state is a state in which a direction, in which image capturing using the image capturing unit is performed, and a direction of a display face of the display unit are approximately the same.

3. The image capturing device according to claim 1, wherein the specific state is a state in which the image capturing device is photographing a photographer of the image capturing device, and display face of the display unit faces the photographer.

4. The image capturing device according to claim 1, wherein the image capturing device is a smartphone having an inner camera and an outer camera, and wherein the specific state is a state in which image capturing is performed using the inner camera.

5. The image capturing device according to claim 1, wherein the control unit does not display the item on the display unit during recording of a video using the image capturing unit.

6. The image capturing device according to claim 1, further comprising a setting unit configured to receive a setting indicating whether or not camera shake correction is performed, wherein the control unit does not display the item on the display unit in a case in which the setting unit has received the setting indicating whether or not the camera shake correction is performed.

7. The image capturing device according to claim 1, wherein the control unit does not display the item on the display unit in a case in which a wide-angle lens is mounted in the image capturing device.

8. The image capturing device according to claim 7, wherein the control unit does not display the item on the display unit in a case in which a focal distance of a lens of the image capturing device is a predetermined value or less.

9. The image capturing device according to claim 1, wherein the display unit includes a touch panel, and wherein the item is an item, which is displayed on the display panel, and for which a touch operation can be performed by a user.

10. The image capturing device according to claim 9, wherein the control unit invalidates a touch operation for the item when the first angle-of-view display is performed.

11. The image capturing device according to claim 1, wherein the item is displayed to overlap a live-view image displayed on the display unit.

12. The image capturing device according to claim 1, wherein the item is displayed in an end part of the display unit.

13. The image capturing device according to claim 1, wherein, in response to an operation on the item, the display is able to be changed from the second angle-of-view display to either the first angle-of-view display or the third angle-of-view display.

14. The image capturing device according to claim 13, wherein the control unit is configured to:
change to the first angle-of-view display in response to the operation performed on the item while the second angle-of-view display is displayed; and
change to the third angle-of-view display in response to the operation performed on the item while the first angle-of-view display is displayed.

15. The image capturing device according to claim 14, wherein the control unit is configured to control display such that:
the item is displayed in an enabled state in both the second angle-of-view display and the first angle-of-view display; and
the item is displayed in a disabled state in the third angle-of-view display.

16. The image capturing device according to claim 14, wherein the control unit is configured to control display such that:

in the second angle-of-view display, both an item indicating the second angle-of-view display and the item are displayed;

when the display is changed to the first angle-of-view display, both an item indicating the first angle-of-view display and the item are displayed; and when the display is changed to the third angle-of-view display, an item indicating the third angle-of-view display is displayed while the item is displayed in a disabled state.

17. A method of controlling an image capturing device including an image capturing unit and a control unit configured to perform control such that an image captured by the image capturing unit is displayed on a display unit, the method comprising:

performing, by the control unit, first angle-of-view display displaying the image with a first angle-of-view on the display unit;

performing, by the control unit, second angle-of-view display displaying the image with a second angle-of-view narrower than the first angle-of-view on the display unit by performing camera shake correction on the image;

displaying, by the control unit, an item for changing from the second angle-of-view display to the first angle-of-view display on the display unit in a case in which the image capturing device comes into a specific state when the second angle-of-view display is performed; and performing, by the control unit, third angle-of-view display displaying the image on the display unit with a third angle-of-view wider than the first angle-of-view, wherein the first angle-of-view display is display performed when hand shake correction, the strength of which is weaker than that of the camera shake correction at the time of the second angle-of-view display, is performed, and the third angle-of-view display is display performed when the camera shake correction is not performed.

18. A computer-readable storage medium storing a program causing a computer to function as each units of the image capturing device according to claim 1.

* * * * *